United States Patent
Kaga et al.

(10) Patent No.: US 11,018,876 B2
(45) Date of Patent: May 25, 2021

(54) SIGNATURE VERIFICATION SYSTEM, SIGNATURE VERIFICATION METHOD, AND STORAGE MEDIUM

(71) Applicant: HITACHI, LTD., Tokyo (JP)

(72) Inventors: Yosuke Kaga, Tokyo (JP); Kenta Takahashi, Tokyo (JP); Masakazu Fujio, Tokyo (JP); Ken Naganuma, Tokyo (JP)

(73) Assignee: HITACHI, LTD., Tokyo (JP)

( * ) Notice: Subject to any disclaimer, the term of this patent is extended or adjusted under 35 U.S.C. 154(b) by 322 days.

(21) Appl. No.: 16/318,501

(22) PCT Filed: May 16, 2017

(86) PCT No.: PCT/JP2017/018291
§ 371 (c)(1),
(2) Date: Jan. 17, 2019

(87) PCT Pub. No.: WO2018/016160
PCT Pub. Date: Jan. 25, 2018

(65) Prior Publication Data
US 2019/0238344 A1    Aug. 1, 2019

(30) Foreign Application Priority Data
Jul. 21, 2016    (JP) .............................. JP2016-143152

(51) Int. Cl.
*H04L 29/06* (2006.01)
*H04L 9/32* (2006.01)
(Continued)

(52) U.S. Cl.
CPC ............ *H04L 9/3268* (2013.01); *G06F 21/32* (2013.01); *G06F 21/33* (2013.01); *G06F 21/64* (2013.01);
(Continued)

(58) Field of Classification Search
CPC .......... G06F 21/32; G06F 21/33; G06F 21/64; H04L 2209/38; H04L 9/0891;
(Continued)

(56) References Cited

U.S. PATENT DOCUMENTS

2015/0270977 A1*  9/2015  Martins ..................... H04L 9/30
                                                                                380/30
2015/0312041 A1* 10/2015  Choi ................... H04L 63/0861
                                                                                713/175

FOREIGN PATENT DOCUMENTS

JP    2013-123142 A    6/2013

OTHER PUBLICATIONS

Y. Chung, K. Moon and H. Lee, "Biometric Certificate Based Biometric Digital Key Generation with Protection Mechanism," 2007 Frontiers in the Convergence of Bioscience and Information Technologies, Jeju City, 2007, pp. 709-714, doi: 10.1109/FBIT. 2007.151. (Year: 2007).*

(Continued)

*Primary Examiner* — Joseph P Hirl
*Assistant Examiner* — Ka Shan Choy
(74) *Attorney, Agent, or Firm* — Volpe Koenig

(57) ABSTRACT

Provided is a signature verification system comprising: a signature terminal including a biometric information acquisition unit for acquiring biometric information of a user, a public template certificate generation unit for generating a public template certificate by subjecting the biometric information to predetermined processing, a key pair generation unit for generating a pair of a secret key and a public key, and a public key certificate generation unit for generating a public key certificate by providing a biometric signature to the public key with the biometric information used as a key; and a verification terminal including a public key certificate verification unit for receiving a transaction including the (Continued)

public template certificate, the public key certificate, and a signature to verify the validity of the public key certificate using the public template certificate, and a signature verification unit for verifying the signature using the public key certificate.

15 Claims, 21 Drawing Sheets

(51) Int. Cl.
*G06F 21/33* (2013.01)
*G06F 21/32* (2013.01)
*G06F 21/64* (2013.01)
*H04L 9/08* (2006.01)

(52) U.S. Cl.
CPC .......... *H04L 9/0891* (2013.01); *H04L 9/0894* (2013.01); *H04L 9/3239* (2013.01); *H04L 9/3247* (2013.01); *H04L 2209/38* (2013.01)

(58) Field of Classification Search
CPC ... H04L 9/0894; H04L 9/3239; H04L 9/3247; H04L 9/3268
See application file for complete search history.

(56) References Cited

OTHER PUBLICATIONS

Satoshi Nakamoto, "Bitcoin: A Peer-to-Peer Electronic Cash System", 2008.
International Search Report for PCT/JP2017/018291, dated Aug. 15, 2017.

* cited by examiner

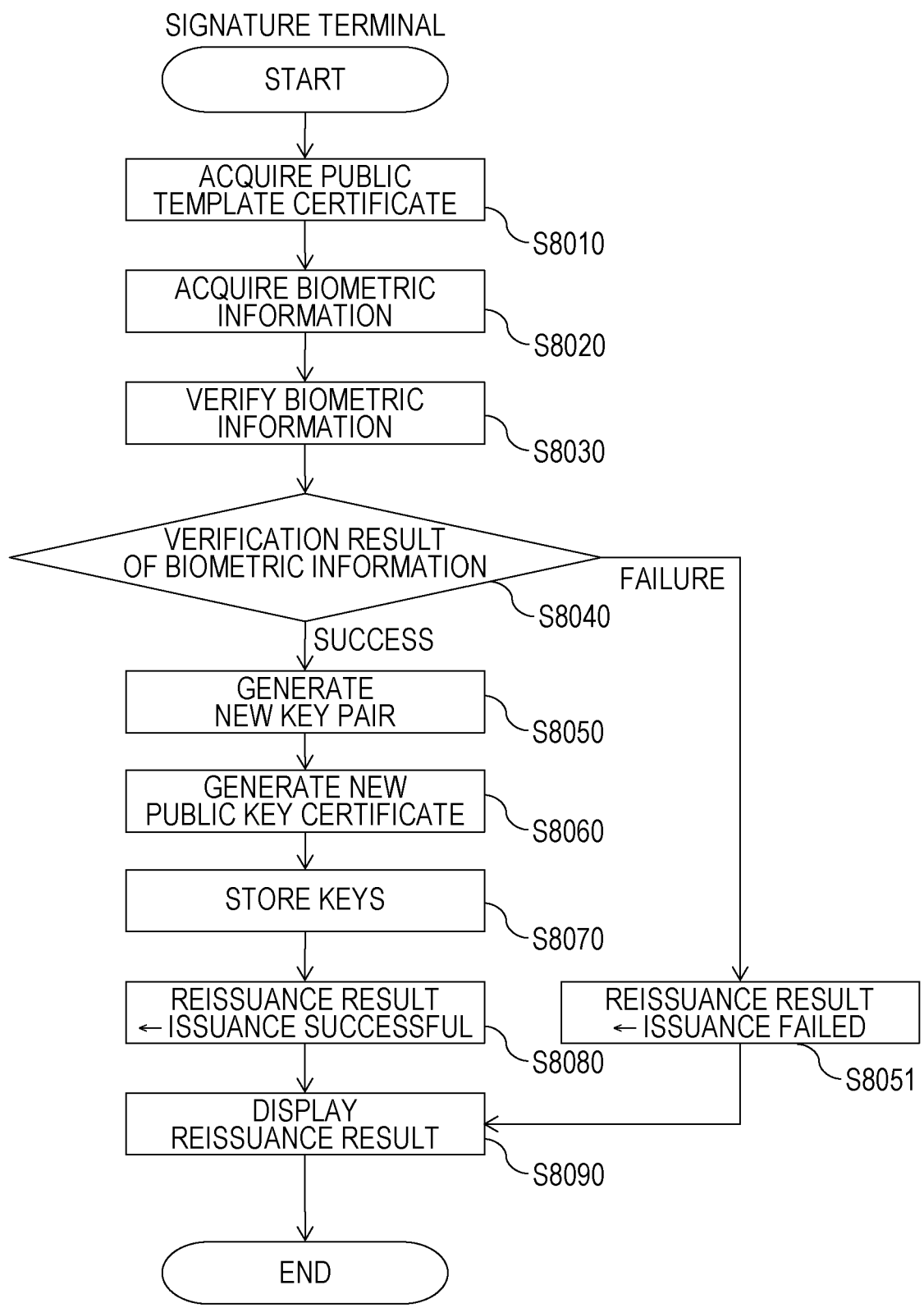

FIG. 9A

| PUBLIC TEMPLATE CERTIFICATE | 9000 |
|---|---|
| VERSION | 9010 |
| PUBLIC TEMPLATE SERIAL NUMBER | 9020 |
| SIGNATURE ALGORITHM | 9030 |
| ISSUER | 9040 |
| EXPIRATION DATE | 9050 |
| SUBJECT | 9060 |
| BIOMETRIC SIGNATURE ALGORITHM | 9070 |
| PUBLIC TEMPLATE | 9080 |
| SIGNATURE ALGORITHM | 9090 |
| SIGNATURE VALUE | 9091 |

FIG. 9B

| PUBLIC KEY CERTIFICATE | 9100 |
|---|---|
| VERSION | 9110 |
| PUBLIC TEMPLATE SERIAL NUMBER | 9120 |
| PUBLIC KEY SERIAL NUMBER | 9121 |
| BIOMETRIC SIGNATURE ALGORITHM | 9130 |
| ISSUER | 9140 |
| EXPIRATION DATE | 9150 |
| SUBJECT | 9160 |
| PUBLIC KEY ALGORITHM | 9170 |
| PUBLIC KEY | 9180 |
| BIOMETRIC SIGNATURE ALGORITHM | 9190 |
| BIOMETRIC SIGNATURE VALUE | 9191 |

SIGNATURE VERIFICATION SYSTEM, SIGNATURE VERIFICATION METHOD, AND STORAGE MEDIUM

INCORPORATION BY REFERENCE

This application claims the priority of JP 2016-143152 A which is a Japanese application filed on Jul. 21, 2016, the contents of which incorporated herein by reference.

TECHNICAL FIELD

The present invention relates to a blockchain (signature verification) system that implements distributed ledger management on a peer-to-peer (P2P) network.

BACKGROUND ART

As technology to implement distributed ledger management on a P2P network, blockchains are known. In a blockchain, transactions containing record information are created and linked in a chain form on the basis of digital signatures, whereby consistency of record information is ensured.

As an example of a blockchain, there is a system, typically the Bitcoin disclosed in NPTL 1, in which a chain is formed with a user, who guarantees record information, adding a digital signature to a transaction with the user's own secret key. In such a blockchain system, by verifying the digital signature for the transaction on the basis of a public key included in the transaction, it is determined that a legitimate user has generated the transaction.

CITATION LIST

Patent Literature

PTL 1: JP 2013-123142 A

Non-Patent Literature

NPTL 1: NAKAMOTO, Satoshi, "Bitcoin: A peer-to-peer electronic cash system." Issued in 2008.

SUMMARY OF INVENTION

Technical Problem

In a blockchain system, since a user generates a transaction by generating a digital signature using the user's own secret key, in the case where the secret key is lost, a correct transaction can no longer be generated, and thus it becomes difficult to continue to use the system. In addition, in the case where the secret key is stolen, a third party who has acquired the secret key can generate a transaction fraudulently, and thus it is possible to impersonate.

As an apparent and effective solution to such a problem, there is a method for managing confidential information in such a manner that loss or theft is unlikely to occur. As a method for implementing the public key cryptography on the basis of information that is unlikely to be lost or stolen, a biometric signature disclosed in PTL 1 is known. The biometric signature is a technique for implementing signature generation or signature verification for a message by using biometric information typified by fingerprints, veins, faces, etc. as a key. Since biometric information is obtained by sensing human physical features, the inform is less likely to be lost or stolen as compared with a secret key of public key cryptography which are publicly known or well-known.

However, depending on a use case of the blockchain system, there are cases where it is necessary to generate transactions frequently or it is necessary to generate transactions automatically without human intervention. In such cases, a user's digital signature is required each time a transaction is generated. In the case of a biometric signature, biometric information is input each time a transaction is generated, and thus the convenience of the user may be disadvantageously deteriorated.

An object of the present invention is to implement a system that enables continuous transaction generation even in the case where loss or leakage of a secret key occurs, without lowering convenience of users.

Solution to Problem

The present invention is a signature verification system for verifying a signature by a computer including a processor and a memory, the signature verification system including: a biometric information acquiring unit for acquiring biometric information of a user; a public template certificate generating unit for generating a public template certificate by applying predetermined processing to the biometric information; a key pair generating unit for generating a pair of a secret key and a public key; a public key certificate generating unit for generating a public key certificate by attaching a biometric signature to the public key using the biometric information as a key; and a verifying unit for accepting a transaction including the public template certificate, the public key certificate, and the signature, verifying validity of the public key certificate with the public template certificate, and verifying the signature with the public key certificate.

Advantageous Effects of Invention

According to the present invention, when a user's existing secret key is lost or leaked, the user issues a public key revocation application form to invalidate transaction generation using the existing secret key, and a pair of a new secret key and a new public key is generated for attachment of a biometric signature to the new public key using biometric information as a key to issue a new public key certificate. Thereafter, a transaction is generated using the new secret key, which enables continuous use of the signature verification system without using the existing secret key.

BRIEF DESCRIPTION OF DRAWINGS

FIG. 8 is a flowchart illustrating the first embodiment of the present invention and illustrating a processing procedure of reissuance of a key.

FIG. 9A is a diagram illustrating the first embodiment of the present invention and illustrating a data structure of a public template certificate.

FIG. 9B is a diagram illustrating the first embodiment of the present invention and illustrating a data structure of a public key certificate.

DESCRIPTION OF EMBODIMENTS

Hereinafter, embodiments of the present invention will be described on the basis of the accompanying the drawings.

First Embodiment

The present embodiment is a system that enables continuous use of a blockchain system (biometric signature system) by allowing, when a user's secret key is lost or leaked, a user of the blockchain system to use a biometric signature using biometric information of the user as a key to revoke (invalidate) the secret key and to reissue a new secret key.

The procedure will be described below with reference to the drawings.

Figure 1:
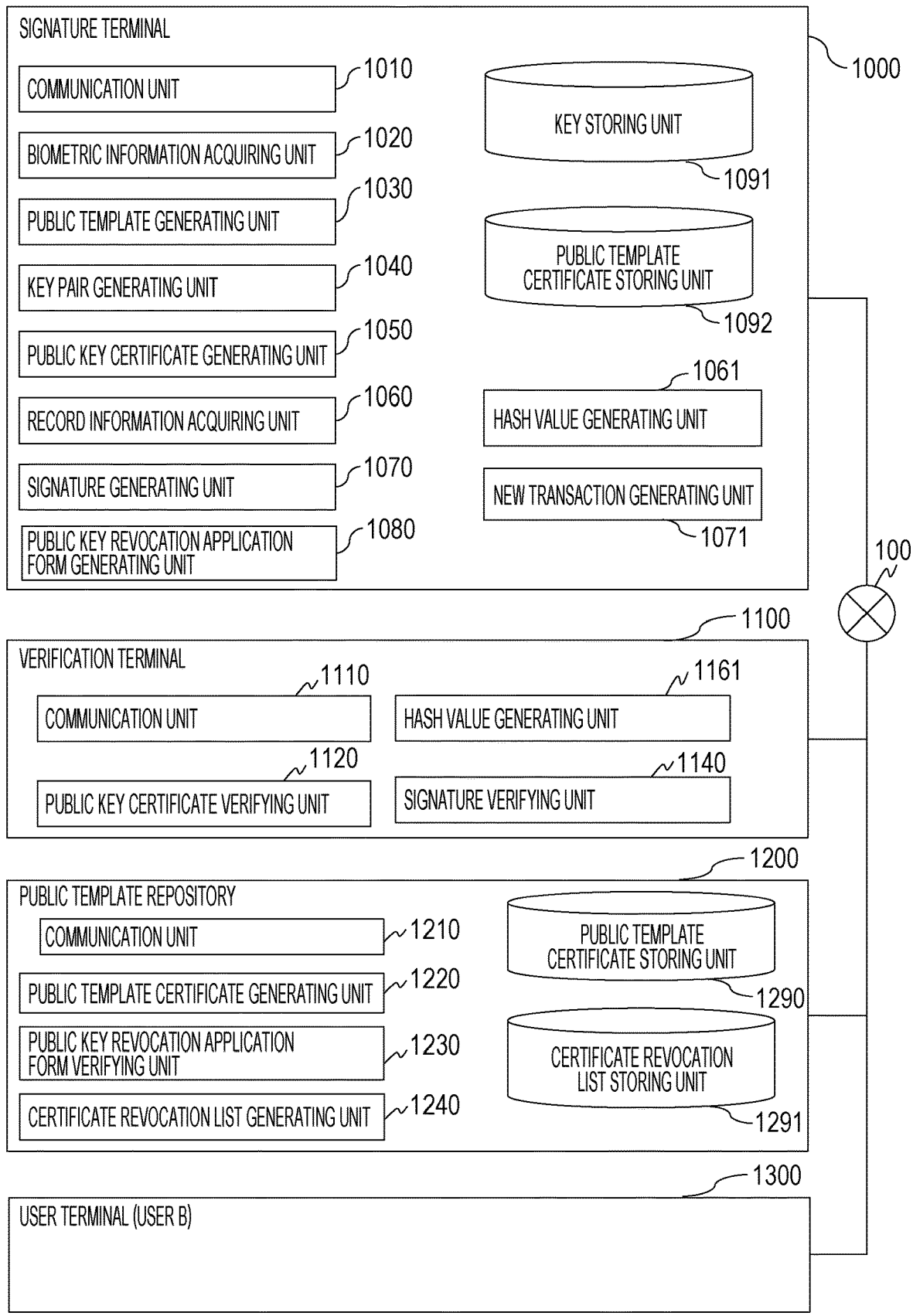
FIG. 1 is a block diagram illustrating a first embodiment of the present invention and illustrating an exemplary blockchain system.

FIG. 1 is a block diagram illustrating an exemplary configuration of a blockchain system according to a first embodiment of the present invention. The blockchain system includes a signature terminal 1000, a verification terminal 11000, a public template repository 1200, a user terminal 1300, and a network 100 that connects these terminals.

In this figure, the signature terminal 1000 includes a communication unit 1010, a biometric information acquiring unit 1020, a public template generating unit 1030, a key pair generating unit 1040, a public key certificate generating unit 1050, a record information acquiring unit 1060, a hash value generating unit 1061, a signature generating unit 1070, a new transaction generating unit 1071, a public key revocation application form generating unit 1080, a key storing unit 1091, and a public template certificate storing unit 1092.

The communication unit 1010 performs communication with the verification terminal 1100 and the public template repository 1200 via the network 100.

The biometric information acquiring unit 1020 acquires biometric information such as a fingerprint, veins, or a face image from a user via, for example, a fingerprint sensor, a vein sensor, a camera, etc. Note that, as a sensor for acquiring biometric information, a fingerprint sensor, a vein sensor, or a camera of a mobile phone or a smartphone can be used.

The public template generating unit 1030 generates a public template by applying unidirectional (irreversible) conversion to the biometric information acquired by the biometric information acquiring unit 1020 in accordance with the method of PTL 1. Note that, as unidirectional conversion, publicly known or well-known conversion processing may be applied.

The key pair generating unit 1040 generates a pair of a secret key and a public key using publicly known or well-known public key cryptography (RSA, DSA, etc.).

The public key certificate generating unit 1050 adds, to the public key generated by the key pair generating unit 1040, a biometric signature using the biometric information acquired by the biometric information acquiring unit 1020 as a key to generate a public key certificate.

The record information acquiring unit 1060 acquires record information to be written in a transaction from an input from an input device or other means.

The hash value generating unit 1061 generates a hash value by inputting the record information acquired by the record information acquiring unit 1060 or other information to a predetermined hash function.

The signature generating unit 1070 generates a signature value using the secret key for the hash value generated by the hash value generating unit 1061.

The new transaction generating unit generates a new transaction including the public key certificate generated by the public key certificate generating unit 1050, a public template certificate (described later), the record information acquired by the record information acquiring unit 1060, the hash value generated by the hash value generating unit 1061, the signature generated by the signature generating unit 1070, etc.

The public key revocation application form generating unit 1080 generates a public key revocation application form from the public key certificate generated by the public key certificate generating unit 1050.

Next, the verification terminal 1100 includes a communication unit 1110, a public key certificate verifying unit 1120, a hash value generating unit 1161, and a signature verifying unit 1140.

The public key certificate verifying unit 1120 verifies the validity of the public key certificate generated by the public key certificate generating unit 1050 of the signature terminal 1000 using the public template.

The signature verifying unit 1140 verifies the validity of the signature value generated by the signature generating unit 1070 of the signature terminal 1000 using the public key certificate.

The communication unit 1110 performs communication with the signature terminal 1000 and the public template repository 1200 via the network 100.

Next, the public template repository 1200 includes a communication unit 1210, a public template certificate generating unit 1220, a public key revocation application form verifying unit 1230, a certificate revocation list generating unit 1240, a public template certificate storing unit 1290, and a certificate revocation list storing unit 1291.

The public template certificate generating unit 1220 generates a public template certificate from the public template generated by the public template generating unit 1030 of the signature terminal 1000.

The public key revocation application form verifying unit 1230 verifies validity of the public key revocation application form generated by the public key revocation application form generating unit 1080 of the signature terminal 1000 with the public template certificate generated by the public template certificate generating unit 1220.

The certificate revocation list generating unit 1240 generates a certificate revocation list 9300 (FIG. 9D) on the basis of the public key revocation application form generated by the public key revocation application form generating unit 1080 of the signature terminal 1000.

The public template certificate storing unit 1290 stores the public template certificate generated by the public template certificate generating unit 1220.

The certificate revocation list storing unit 1291 stores the certificate revocation list 9300 generated by the certificate revocation list generating unit 1240. The communication unit 1210 performs communication with the signature terminal 1000 and the verification terminal 1100 via the network 100.

The user terminal 1300 is a computer used by a user B and is a transmission destination to which a user A using the signature terminal 1000 transmits a transaction. The user terminal 1300 is a computer having a configuration similar to that of the signature terminal 1000.

A processing procedure according to the first embodiment of the present invention will be described with reference to FIGS. 2 to 11.

Figure 2:
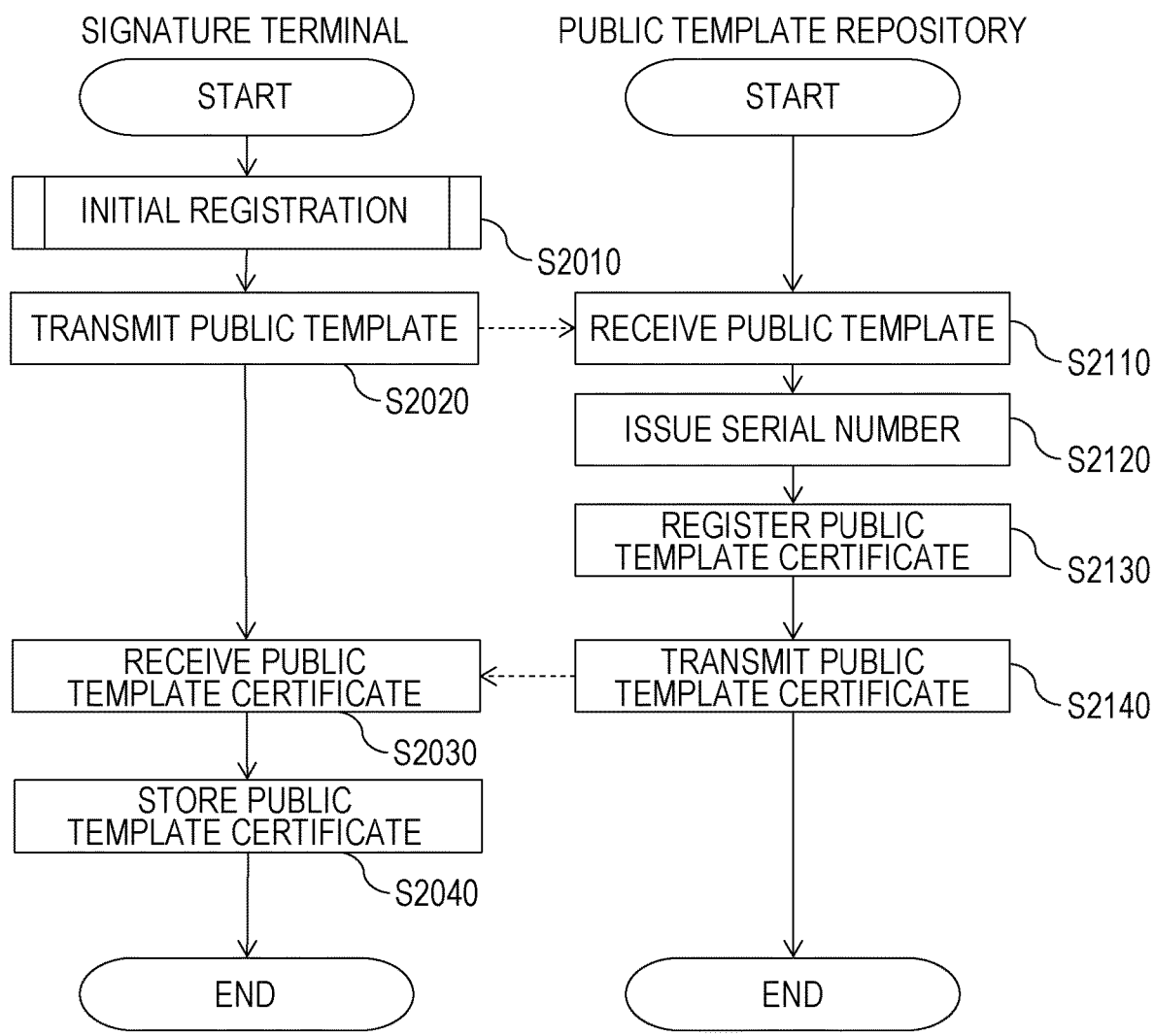
FIG. 2 is a flowchart illustrating the first embodiment of the present invention and illustrating a processing procedure of issuing a public template certificate.

FIG. 2 is a flowchart illustrating a processing procedure of initial registration of the public template certificate according to the first embodiment of the present invention. This processing enables use of the blockchain system by causing the signature terminal 1000 to acquire biometric information from the user and causing the public template repository 1200 to generate the public template certificate. Each procedure will be described below.

At the signature terminal 1000, initial registration is performed (S2010). The specific procedure of the initial registration will be described later with reference to FIG. 3. By this procedure, the public template is generated.

The signature terminal 1000 transmits the public template to the public template repository 1200 (S2020). At this time, the signature terminal 1000 also simultaneously transmits information required for generating the public template certificate, such as a user name and a biometric signature algorithm used for generating the public template. Note that, in order to prevent tampering, a biometric signature may be added to such information.

The public template repository 1200 receives the public template (S2110) and issues a serial number for the received public template (S2120). A serial number is uniquely given to a public template and managed by the public template repository 1200 so as not to overlap.

The public template repository 1200 adds a signature to the public template to generate and register the public template certificate (S2130). The data structure of the public template certificate will be described later with reference to FIG. 9A. In the first embodiment, it is assumed that the public template repository 1200 functions as a reliable third-party organization and that no fraud is performed.

Therefore, the signature for the public template is generated using a secret key of a certificate authority stored in the public template repository 1200. This makes it difficult for third parties who do not have the secret key of the certificate authority to generate the public template certificate, which enables prevention of impersonation with issuance of an unauthorized public template certificate.

The public template repository 1200 transmits the public template certificate generated in step S2130 to the signature terminal 1000 (S2140), and the signature terminal 1000 receives the public template certificate (S2030).

The signature terminal 1000 stores the public template certificate received in step S2030 in the public template certificate storing unit 1092 (S2040).

In this manner, the initial registration of the public template certificate is completed.

Next, a specific procedure of the initial registration processing performed in step S2010 of FIG. 2 will be described with reference to FIG. 3.

The biometric information acquiring unit 1020 of the signature terminal 1000 acquires the biometric information of the user (S3010). Biometric sensors such as a fingerprint sensor, a vein sensor, and a camera are connected to the signature terminal 1000. By using these sensors, the biometric information acquiring unit 1020 acquires biometric information such as fingerprints, veins, facial images, etc. of the user.

The public template generating unit 1030 generates a public template by applying unidirectional conversion to the biometric information acquired in step S3010 (S3020). In this conversion, a biometric encryption method is adopted in which errors included in biometric information are corrected to generate unique data and encryption processing is performed using the obtained data as a key. Examples of methods that can be used for this conversion include the fuzzy commitment, the fuzzy vault, and the biometric signature disclosed in PTL 1. Hereinafter, description will be given assuming the biometric signature disclosed in PTL 1.

In biometric signature, the public template is generated by applying unidirectional conversion to biometric information. Even when a third party acquires the public template, it is quite difficult to restore the biometric information and thus can be handled as public information like the public key.

The key pair generating unit 1040 of the signature terminal 1000 generates a pair of a secret key and a public key (S3030). This key pair is generated on the basis of public key cryptography such as publicly known or well-known RSA encryption, DSA encryption, or Elgamal encryption.

The public key certificate generating unit 1050 of the signature terminal 1000 generates a public key certificate by adding, to the public key obtained in step S3030, a biometric signature using the biometric information acquired in step S3010 as a key (S3040). The data structure of the public key certificate will be described later with reference to FIG. 9B.

The signature terminal 1000 stores the secret key generated in step S3030 and the public key certificate generated in step S3040 in the key storing unit 1091 (S3050).

In the above manner, the key pair and the public key certificate are generated, and the initial registration processing in step S2010 is completed.

Figure 4:
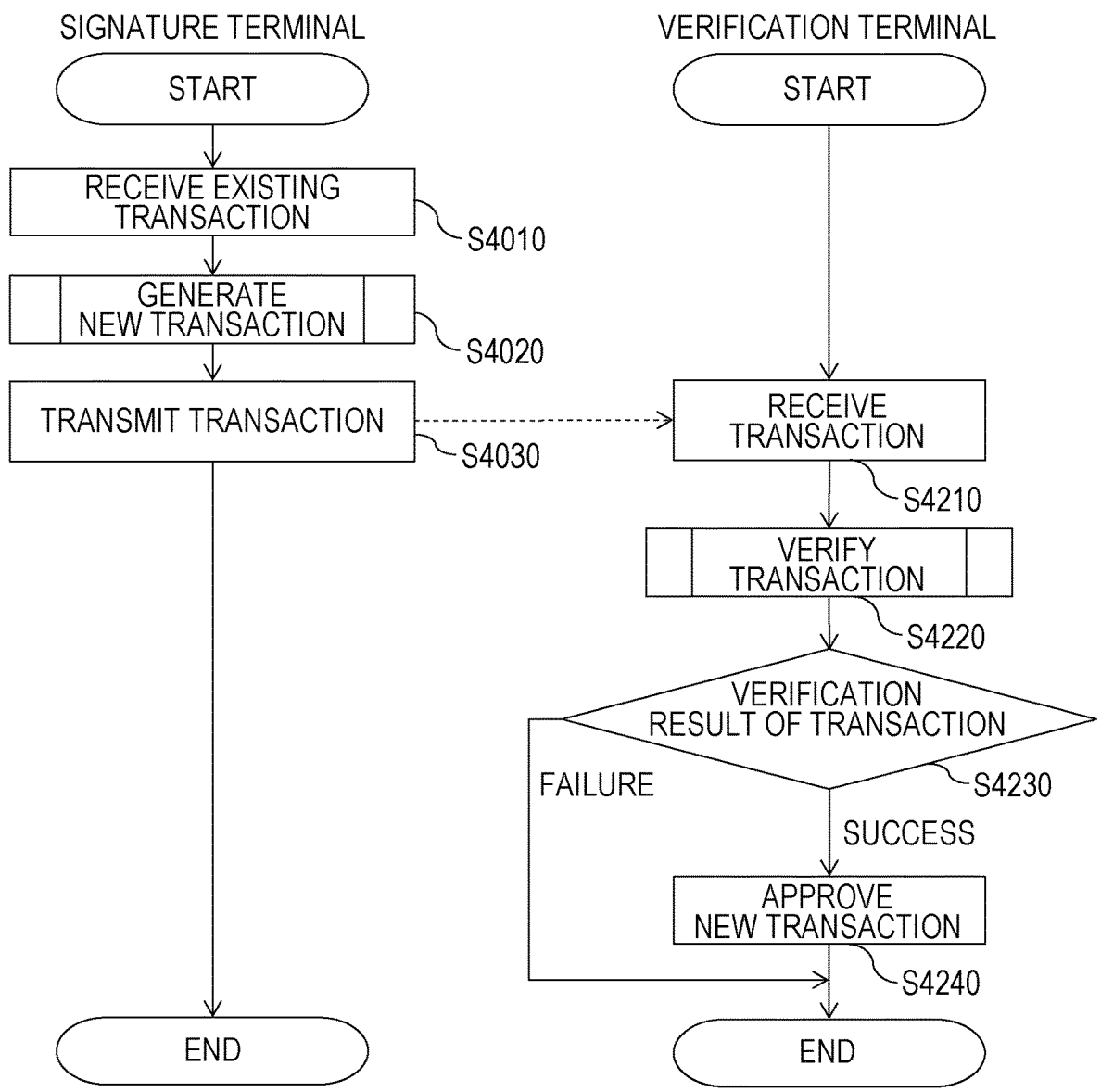
FIG. 4 is a flowchart illustrating the first embodiment of the present invention and illustrating a processing procedure of transaction generation and transaction verification in the blockchain system.

FIG. 4 is a diagram illustrating a procedure of generation and verification of a transaction in the blockchain system which is executed after completion of the initial registration illustrated in FIG. 2. In this processing, after completion of the initial registration in the signature terminal 1000, a new transaction is generated for an existing transaction, and the validity of the new transaction is verified in the verification terminal 1100. The procedure will be described below with reference to the drawing.

The signature terminal 1000 receives an existing transaction (S4010). The existing transaction has been generated in the past in the blockchain system and is positioned one transaction prior to the new transaction to be generated.

For example, in the case of a virtual currency using a blockchain, an existing transaction is a transaction indicating remittance from another person, and a new transaction is a transaction to remit the remitted virtual currency to another person.

The data structures of an existing transaction and a new transaction will be described later with reference to FIG. 10. Meanwhile, the existing transaction is acquired from the network (P2P network) 100 via the communication unit 1010. Note that existing transactions may be collected in advance and that an existing transaction may be acquired by reading from a storage device in the signature terminal 1000.

The signature terminal 1000 generates a new transaction as a transaction to be linked next to the existing transaction received in step S4010 (S4011). A detailed procedure of generating the new transaction will be described later with reference to FIG. 5.

The signature terminal 1000 transmits the existing transaction received in step S4010 and the new transaction generated in S4011 to the verification terminal 1100 using the communication unit 1010 (S4030).

The verification terminal 1100 receives the existing transaction and the new transaction transmitted in step S4030 with the communication unit 1110 (S4210). Note that, for the sake of simplicity, in FIG. 4 the signature terminal 1000 and the verification terminal 1100 directly communicate with each other to exchange necessary data; however, in an actual blockchain system, the signature terminal 1000 and the verification terminal 1100 are connected to the network 100 to which a number of terminals are connected, and data is transmitted and received via other terminals.

The verification terminal 1100 verifies the validity of transactions using the public template certificate included in the existing transaction (S4220). In the verification of a transaction, it is determined that there is no inconsistency in the contents of an existing transaction and a new transaction and that it is ensured that the transaction has been generated by the legitimate user. A detailed procedure of transaction verification will be described later with reference to FIG. 6.

The verification terminal 1100 performs a conditional branch depending on the verification result of the transaction (S4230) and approves the new transaction only when the verification result is successful (S4240). Approval of a transaction is processing by the verification terminal 1100 to recognize the new transaction as being appropriate, and a specific procedure varies depending on a target blockchain system. For example in the case of the Bitcoin which is one of virtual currencies using a blockchain, approved new transactions are grouped, to which a header is added to generate a block.

In the above manner, generation and verification of a transaction in the blockchain system are completed.

Figure 5:
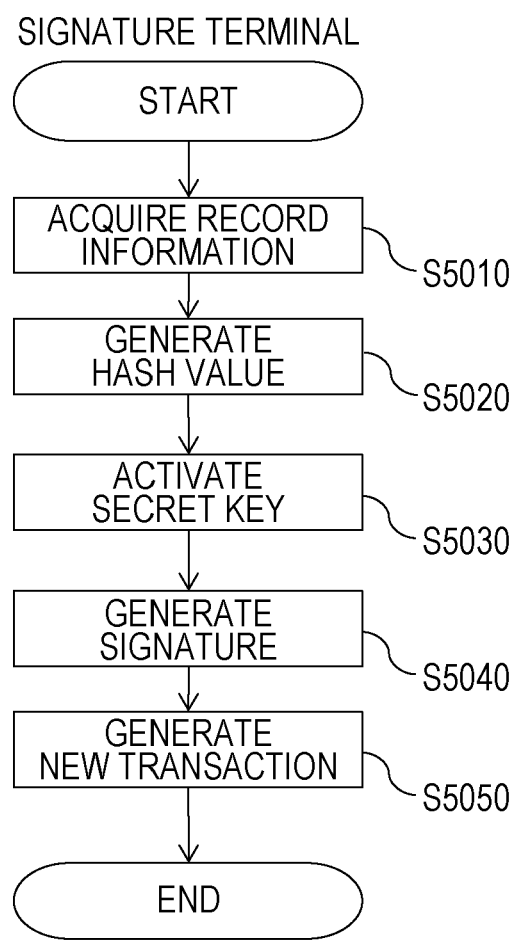
FIG. 5 is a flowchart illustrating the first embodiment of the present invention and illustrating a processing procedure of a new transaction.

FIG. 5 is a flowchart illustrating a processing procedure of generating a new transaction (S4020) according to the first embodiment of the present invention. The procedure will be described below with reference to the drawing.

The signature terminal 1000 acquires record information (message) to be included in the new transaction (S5010). Record information is information to be approved in the blockchain system. For example in the case of a virtual currency, record information is a transaction of the currency between users, and in the case of a smart contract, record information is the content of the contract.

The hash value generating unit 1061 of the signature terminal 1000 generates a hash value of the information included in the new transaction (S5020).

Next, the new transaction generating unit 1071 of the signature terminal 1000 activates the secret key stored in the key storing unit 1091 to add a signature (S5030). In the case where the key storing unit 1091 is an auxiliary storage device in the signature terminal 1000, activation of the secret key is performed by reading secret key data from the auxiliary storage device to a main storage device. At that time, in the case where the secret key is encrypted with a password, the password is accepted from the user, and the secret key is retrieved after decryption. Alternatively, in the case where the secret key is stored in a smart device such as an IC card, the secret key is activated by input of the password to the smart device.

The signature generating unit 1070 of the signature terminal 1000 adds a signature to the hash value generated in step S5020 using the secret key activated in step S5030 (step S5040). In the case where the secret key activated in step S5030 is stored in the main storage device of the signature terminal 1000, the signature generating unit 1070 performs signature processing on the main storage device using the secret key. Note that, in the case where the secret key is stored in a smart device, the hash value is input to the smart device, and then a signature is generated in the smart device. The signature value is then acquired.

The new transaction generating unit 1071 generates a new transaction including the record information acquired in step S5010, the signature generated in step S5040, the public template certificate, and the public key certificate (S5050). The data structure of the new transaction will be described later with reference to FIG. 10.

With the above procedure, generation of the new transaction is completed.

Figure 6:
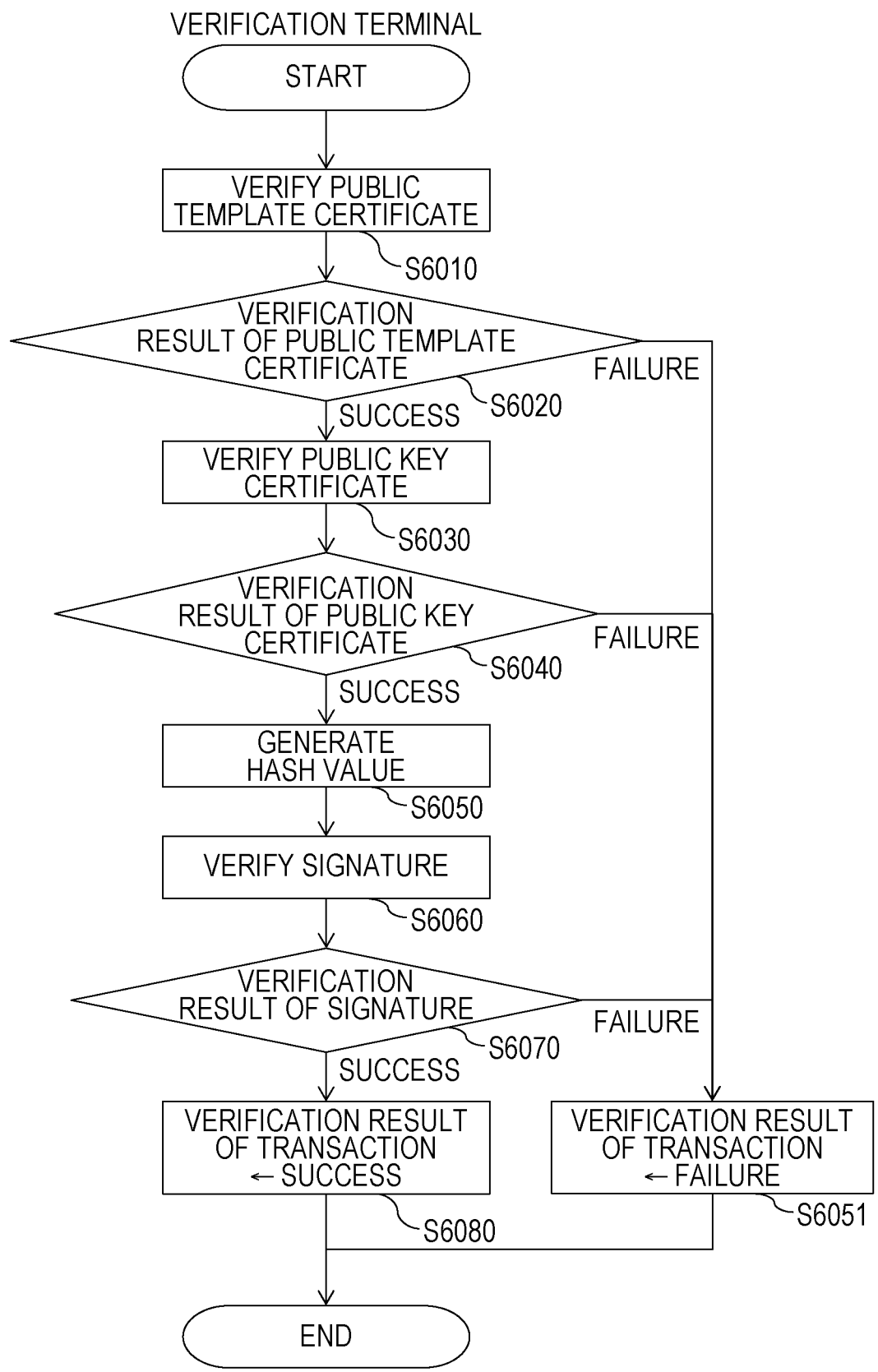
FIG. 6 is a flowchart illustrating the first embodiment of the present invention and illustrating a processing procedure of transaction verification.

FIG. 6 is a flowchart illustrating a processing procedure of transaction verification (S4250). In the present processing, the verification terminal 1100 accepts the new transaction and verifies the validity of each of the public template certificate, the public key certificate, and the signature value included in the new transaction. Only when all the verifications are successful, verification of the new transaction is regarded as being successful. Hereinafter, description will be given with reference to the drawing.

The verification terminal 1100 verifies the validity of the public template certificate included in the new transaction (S6010). The public template certificate is attached with the signature value generated with the secret key of the certificate authority in step S2130, and in this procedure, the signature value is verified using the public key of the certificate authority. As a result, the verification terminal 1100 can verify whether the public template certificate has been certainly issued by the certificate authority.

If the verification result of the public template certificate is successful, the verification terminal 1100 proceeds to the next step S6030, and if the result fails, substitutes failure into the transaction verification result (S6051).

The verification terminal 1100 verifies the validity of the public key certificate included in the new transaction by using the public template certificate included in the existing transaction (S6030). A biometric signature, using biometric information as a key, has been given to the public key certificate in step S3040. The validity whether this biometric signature has been attached by the identical person is verified using the public template certificate.

This allows the verification terminal 1100 to verify that the user who has generated the public template certificate included in the existing transaction is identical to the user who has generated the public key certificate included in the new transaction. The user who has generated the public template certificate included in the existing transaction corresponds to a destination of the currency in the case of a virtual currency, and the user who has generated the public key certificate included in the new transaction corresponds to the sender of the currency in the case of the virtual currency.

That is, in the case of a virtual currency, this verification indicates that the user who wishes to remit money has certainly received remittance in the past and currently possesses the currency. Furthermore in step S6030, it is verified that the public key certificate is not included in the certificate revocation list.

The certificate revocation list is a mechanism for invalidating a public key certificate corresponding to a secret key due to loss or theft of the secret key or other reasons to cause signature verification to fail. The procedure of issuing the certificate revocation list is illustrated later in FIG. 7, and the data structure of the certificate revocation list is illustrated later in FIG. 9D.

Specifically, the verification terminal 1100 compares a serial number included in the public key certificate with a public template serial number included in the certificate revocation list and then compares public key serial numbers included in the public key certificate and the certificate revocation list. If they match, validity of the biometric signature value (9364) is verified using the public template, and validity of the signature value (9370) of the certificate revocation list is further verified. When all the verifications are successful, the verification terminal 1100 determines that the public key certificate has been revoked and regards the verification to have failed.

The verification terminal 1100 performs a conditional branch on the basis of the verification result of step S6030 (S6040), and if the verification is successful, the verification terminal 1100 proceeds to processing of step S6050 and subsequent steps. If the verification fails, failure is substituted into the transaction verification result (S6051).

The hash value generating unit 1161 of the verification terminal 1100 generates a hash value from data in the new transaction (S6050).

The signature verifying unit 1140 of the verification terminal 1100 verifies the validity of the signature using the hash value generated in step S6050 and the public key certificate (S6060). Since the signature is generated by the signature terminal 1000 using the secret key for the hash value of the new transaction in step S5040, the verification terminal 1100 can perform verification the validity of the signature using the public key corresponding to the secret key.

In this verification, the verification terminal 1100 verifies that the user having the secret key has generated the new transaction and further verifies that the contents of the new transaction has not been tampered thereafter.

The verification terminal 1100 performs a conditional branch on the basis of the verification result of step S6060 (S6070), and if the verification is successful, success is substituted into the transaction verification result (S6080). If the verification fails, failure is substituted into the transaction verification result (S6051). The verification terminal 1100 can notify the signature terminal 1000 of the transaction verification result.

In the above manner, the verification terminal 1100 completes the processing of verifying the contents of the transaction.

In FIGS. 2 to 6, a flow from initial registration of the public template certificate to generation of the new transaction and verification of the transaction has been illustrated. The present invention aims to enable use the blockchain system safely and continuously even when a user's secret key is lost or stolen. For this reason, in addition to the normal processing procedures of FIGS. 2 to 6, at times when the secret key is lost or stolen, the public key certificate corresponding to the secret key is revoked and a new public key certificate is issued.

Figure 7:
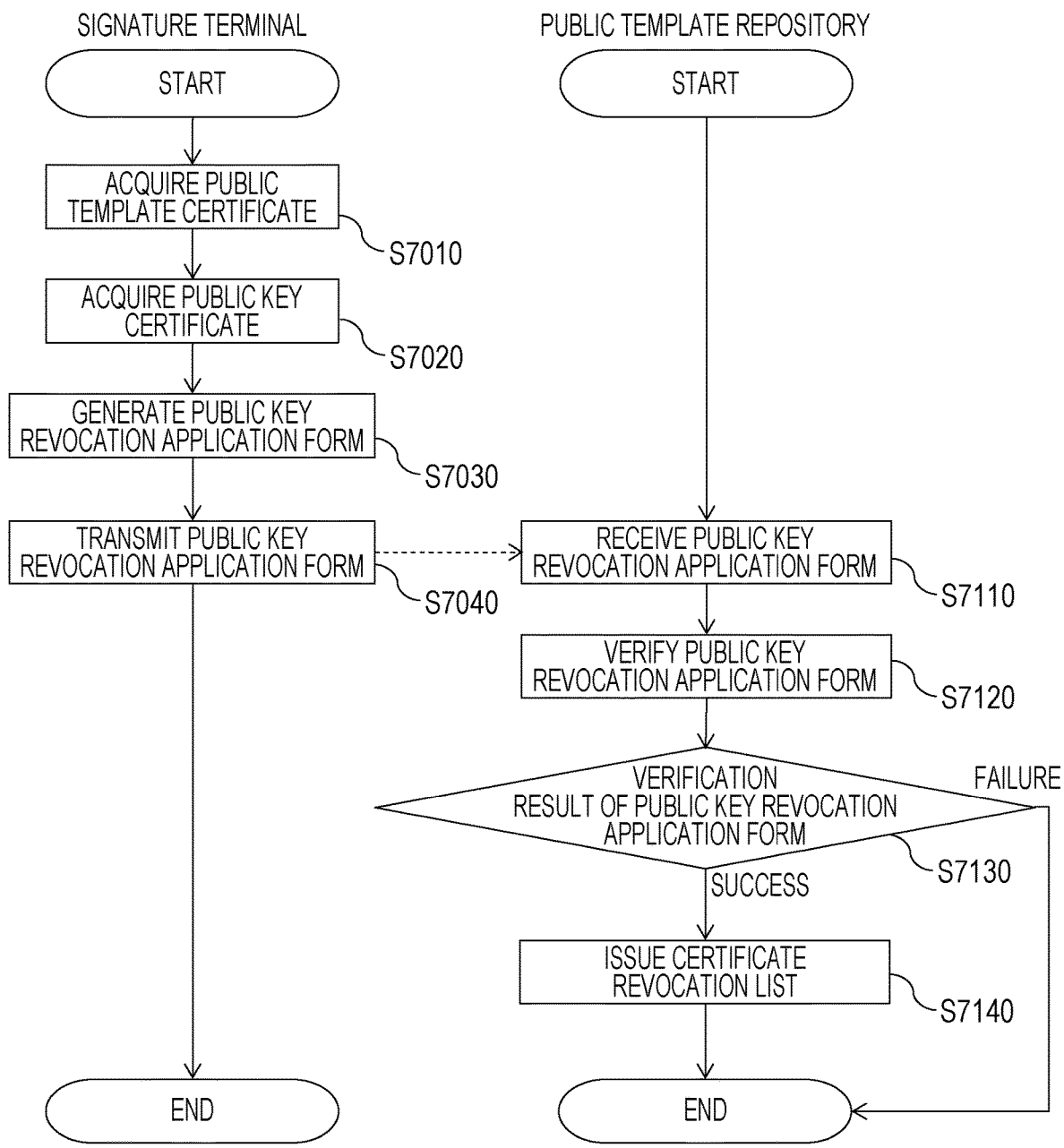
FIG. 7 is a flowchart illustrating the first embodiment of the present invention and illustrating a processing procedure of public key revocation.

FIG. 7 is a flowchart illustrating a processing procedure for revoking a public key certificate. The procedure will be described below with reference to the drawing.

The signature terminal 1000 acquires the public template certificate of the user who revokes the public key certificate (S7010). In the case where the public template certificate is stored in the public template certificate storing unit 1092 of the signature terminal 1000, this processing corresponds to the signature terminal 1000 reading the data. Alternatively, in the case where the serial number of the public template certificate is input, or in the case where only the serial number of the public template certificate is stored in the auxiliary storage device, the signature terminal 1000 makes an inquiry to the public template repository 1200 on the basis of the serial number and obtains the public template certificate.

The signature terminal 1000 acquires the public key certificate to be revoked from the key storing unit 1091 (S7020).

The public key revocation application form generating unit 1080 of the signature terminal 1000 generates a public key revocation application form using the public template certificate acquired in step S7010 and the public key certificate acquired in step S7020 (S7030). The data structure of the public key revocation application form will be described later with reference to FIG. 9C.

The signature terminal 1000 transmits the public key revocation application form generated in step S7030 to the public template repository 1200 (S7040). In addition, the signature terminal 1000 transmits the public key revocation application form also to the user terminal 1300 that transmits and receives transactions. This allows the public template repository 1200 and the user terminal 1300 to verify that the current public key certificate of the signature terminal 1000 has been revoked.

The public template repository 1200 receives the public key revocation application form (S7110), and the public key revocation application form verifying unit 1230 verifies the public key revocation application form (S7120). In this verification, the public key revocation application form verifying unit 1230 verifies that the signature value assigned to the public key revocation application form is correct using the public template certificate.

Specifically, the public key revocation application form verifying unit 1230 acquires the public template certificate corresponding to the user by using the public template serial number included in the public key revocation application form. Furthermore, the public key revocation application form verifying unit 1230 verifies the validity of the signature value included in the public key revocation application form using the public template certificate.

The public key revocation application form verifying unit 1230 performs a conditional branch on the basis of the verification result of step S7120 (S7130), and if the verification is successful, the certificate revocation list generating unit 1240 generates the certificate revocation list 9300 and stores the certificate revocation list 9300 in the certificate revocation list storing unit 1291 (S7140). The data structure of the certificate revocation list will be described later with reference to FIG. 9D.

In the above manner, revocation of the public key certificate is completed. The certificate revocation list issued by the public template repository 1200 is used for verification in the public key certificate verification in step S6030 of FIG. 6, and if the public key certificate is included in the certificate revocation list, the verification fails. As a result, when the public key certificate is revoked due to loss or theft of the secret key or for other reasons, the transaction verification in step S4220 illustrated in FIG. 4 fails, and the transaction is not approved. Therefore, even in the case where a third party acquires the secret key, it is impossible to impersonate to cause a transaction to be approved fraudulently.

FIG. 8 is a flowchart illustrating a processing procedure of reissuing a public key certificate according to the first embodiment of the present invention. In this processing, after revocation of the public key certificate illustrated in FIG. 7 (generation of the public key revocation application form), the signature terminal 1000 generates a new public key certificate to be newly used. Note that, even without revocation of a public key certificate illustrated in FIG. 7, there are cases where the public key certificate is automatically revoked when the public key certificate expires. In such a case, reissuance of a public key certificate illustrated in FIG. 8 can be performed without revocation of the public key certificate illustrated in FIG. 7. In addition, reissuance of a public key certificate illustrated in FIG. 8 can be performed when the public key certificate has not been revoked. This is performed in cases where a plurality of different public key certificates is issued and secret keys corresponding to the public keys are stored in a plurality of terminals of the same user or lent to different users. Hereinafter, description will be given with reference to FIG. 8.

The signature terminal 1000 acquires the public template certificate (S8010). In this processing, the signature terminal 1000 acquires the public template certificate from the public template certificate storing unit 1092 or the public template repository 1200 as in step S7010 of FIG. 7.

The signature terminal 1000 acquires biometric information of the user (S8020). In this processing, as in step S3010 of FIG. 3, the biometric information acquiring unit 1020 acquires biometric information such as a fingerprint, veins, or a face image from the user by a biosensor.

The signature terminal 1000 verifies the validity of the biometric information acquired in step S8020 using the public template certificate acquired in step S8010 (S8030). In this verification, the signature terminal 1000 uses a biometric signature to verify whether the biometric information, from which the public template certificate has been generated, and the biometric information, acquired in step S8020, have been acquired from the same person. If the information has been acquired from the same person, the verification is successful, and if from different persons, the verification fails.

The signature terminal 1000 performs a conditional branch depending on the verification result of step S8030 (S8040). In the case of a success, the processing of step S8050 and subsequent steps is performed. In the case of a failure, "issuance failed" is substituted for the reissuance result (S8051), and the reissuance result is displayed on an output device of the signature terminal 1000 (S8090).

If the verification in step S8040 is successful, the key pair generating unit 1040 of the signature terminal 1000 generates a new key pair of a new secret key and a new public key (S8050). In this processing, the new key pair is generated on the basis of a publicly known or well-known public key cryptography like in S3030.

The public key certificate generating unit 1050 of the signature terminal 1000 generates a new public key certificate on the basis of the new public key generated in step S8050 (S8060). In this processing, as in step S3040 in FIG. 3, the signature terminal 1000 adds a biometric signature to the new public key using the biometric information acquired in step S8020 as a key.

The signature terminal 1000 stores the new secret key generated in step S8050 and the new public key certificate in the key storing unit 1091 (S8070). In addition, the signature terminal 1000 transmits the new public key certificate also to the user terminal 1300 that transmits and receives transactions.

The signature terminal 1000 substitutes "issuance successful" into the reissuance result of the public key certificate (S8080) and displays the reissuance result on the signature terminal 1000 (S8090).

In the above manner, reissuance (update) of the public key certificate is completed. With this processing, the secret key and the public key certificate in the key storing unit 1091 of the signature terminal 1000 are updated, and the new secret key and the new public key certificate are used in the subsequent signature generation and signature verification.

Validity of a transaction generated using this new secret key can be verified with the new public key certificate. Therefore, in the first embodiment, even when a secret key is lost or leaked, a secret key can be newly issued to enable continuous use of the blockchain system.

With the above processing, after generation of the public key revocation application form, the public key certificate generating unit 1050 of the signature terminal 1000 acquires the public template certificate of the user who reissues the key pair from the public template certificate storing unit 1092. Moreover, when the biometric information of the user is acquired, and if verification of a public template 9080 included in the public template certificate and the biometric information is successful, reissuance of the key pair and the public key certificate allows the user to continue to use the blockchain system.

FIGS. 9A to 9D are diagrams each illustrating a data structure of a public template certificate, a public key certificate, a public key revocation application form, and a certificate revocation list, respectively.

FIG. 9A is a diagram illustrating an example of a public template certificate 9000. The public template certificate 9000 is data generated in step S2130 of FIG. 2. The basic data structure is obtained by attaching other header information and a signature value 9091 to the public template 9080, which is compliant with X.509 which is the standards for public key certificates in the public key infrastructure (PKI). Each piece of data will be described below.

A version 9010 indicates a version of the public template certificate by a character string.

A public template serial number 9020 is a character string uniquely allocated to the public template by the public template repository 1200 in such a manner as to avoid overlapping.

A signature algorithm 9030 indicates an algorithm for generating a signature value (9091) to be attached to the public template certificate.

An issuer 9040 indicates an entity that issues the public template certificate, that is, the certificate authority.

An expiration date 9050 indicates the expiration date and time of the public template certificate.

A subject 9060 indicates a subject of the public template certificate, that is, the user who requests issuance of the certificate.

A biometric signature algorithm 9070 indicates an algorithm for generating the public template 9080.

Figure 3:
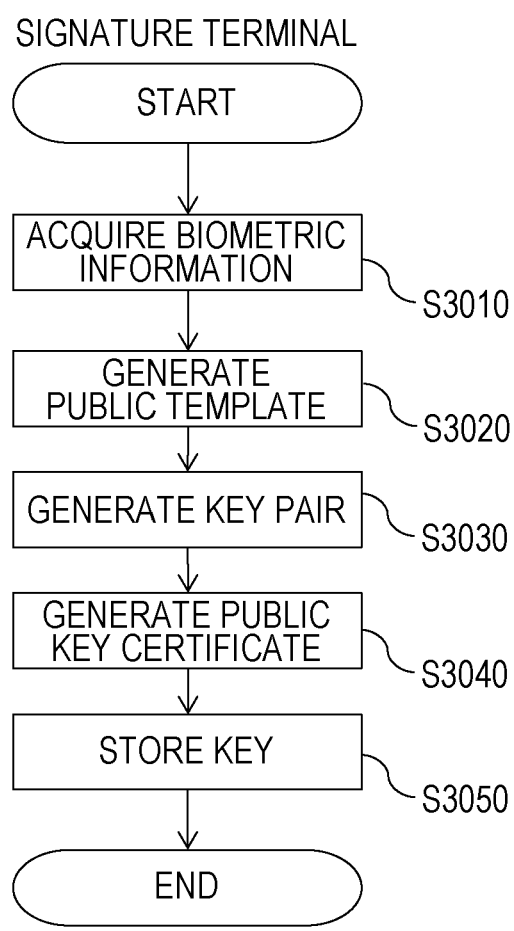
FIG. 3 is a flowchart illustrating the first embodiment of the present invention and illustrating a processing procedure of initial registration.

The public template 9080 indicates the public template generated in step S3020 in FIG. 3.

Like the signature algorithm 9030, a signature algorithm 9090 indicates an algorithm for generating the signature value (9091) to be attached to the public template certificate.

The signature value 9091 is a value obtained by inputting the data of 9010 to 9080 to a hash function (for example, SHA-1, SHA-256, etc.) and converting the obtained hash value with the secret key of the certificate authority.

The above is the data structure of the public template certificate.

FIG. 9B is a diagram illustrating an example of a data structure of a public key certificate.

A public key certificate 9100 is data obtained by attaching a biometric signature using biometric information as a key to the public key generated in step S3040 or S8060, which is compliant with X.509 which is the standards for public key certificates in the public key infrastructure (PKI). Hereinafter, description will be given with reference to the drawing.

A version 9110 indicates a character string representing a version of the public template certificate.

The public template serial number 9120 is a serial number uniquely allocated to the public template by the public template repository 1200 in such a manner as to avoid overlapping.

A public key serial number 9121 is a unique character string assigned to the public key by the key pair generating unit 1040 of the signature terminal 1000 and is generated in such a manner as to avoid overlapping between different public keys.

A biometric signature algorithm 9130 indicates an algorithm for generating a biometric signature value 9191.

An issuer 9140 indicates an entity that issues the public template certificate, that is, the certificate authority.

An expiration date 9150 indicates the expiration date and time of the public template certificate.

A subject 9160 indicates a subject of the public template certificate, that is, the user who requests issuance of the certificate.

A public key algorithm 9170 indicates an algorithm for generating a public key 9180.

The public key 9180 represents the public key generated in step S3030 or S8050.

The biometric signature algorithm 9190 indicates an algorithm for generating the biometric signature value 9191 like the above 9130.

The biometric signature value 9191 is obtained by inputting the above data of 9110 to 9180 to a hash function (for example, SHA-1, SHA-256, etc.) and generating a biometric signature using the biometric information as a key for the obtained hash value.

The above is the data structure of the public key certificate.

Figure 9C:
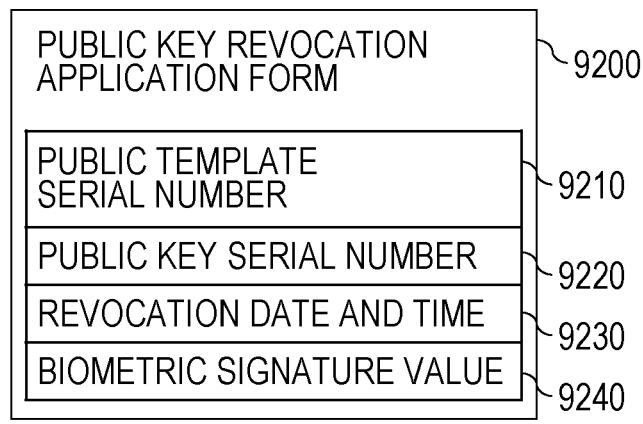
FIG. 9C is a diagram illustrating the first embodiment of the present invention and illustrating a data structure of a public key revocation application form.

FIG. 9C is a diagram illustrating an example of a data structure of a public key revocation application form.

A public key revocation application form 9200 is generated by the public key revocation application form generating unit 1080 of the signature terminal 1000 in step S7030 and is data obtained by adding a biometric signature using biometric information as a key to a public template serial number 9210, a public key serial number 9220, and a revocation date and time 9230.

The public template serial number 9210 and the public key serial number 9220 are data copied from the public template serial number 9120 and the public key serial number 9121 of the public key certificate 9100, respectively. Note that the public template serial number 9210 and the public key serial number 9220 are used as identifiers for specifying the public key certificate 9100.

The revocation date and time 9230 represents the date and time when the public key certificate is to be revoked, and thereafter verification using the public key certificate will fail.

A biometric signature value 9240 is obtained by inputting the above data of 9210 to 9230 to a hash function (for example, SHA-1, SHA-256, etc.) to acquire a hash value and generating a biometric signature using biometric information as a key for the hash value.

The above is the data structure of the public key revocation application form.

Figure 9D:
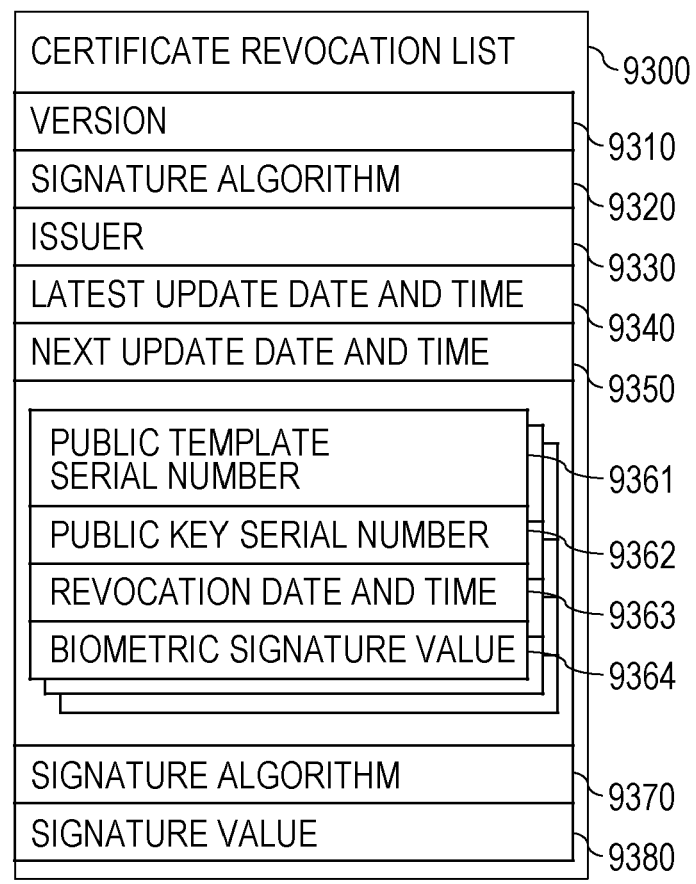
FIG. 9D is a diagram illustrating the first embodiment of the present invention and illustrating a data structure of a certificate revocation list.

FIG. 9D is a diagram illustrating an example of a data structure of a certificate revocation list.

A certificate revocation list 9300 is generated by the public template repository 1200 in step S7140 and is data including one or more public key revocation application forms and added with a header and a signature value. Description will be given below with reference to the drawing.

A version 9310 indicates a character string representing a version of the certificate revocation list.

A signature algorithm 9320 indicates a signature algorithm used for generating a signature value 9380 attached to the certificate revocation list.

An issuer 9330 indicates a character string indicating the subject issuing the certificate revocation list.

A latest update date and time 9340 indicates the date and time when the target certificate revocation list has been issued.

A next update date and time 9350 indicates the date and time when the certificate revocation list will be issued next time.

Data 9361 to 9364 correspond to data 9210 to 9240, respectively, of the public key revocation application form. In the certificate revocation list, public key revocation application forms accepted within a certain period of time are collectively included.

A signature algorithm 9370 indicates a signature algorithm used for generation of a signature value 9380 for the certificate revocation list like the above 9320.

The signature value 9380 is obtained by inputting the data of 9310 to 9364 to a hash function (for example, SHA-1, SHA-256, etc.) and adding a signature to the obtained hash value with the secret key of the certificate authority held by the public template repository 1200.

The above is the data structure of the certificate revocation list.

Figure 10:
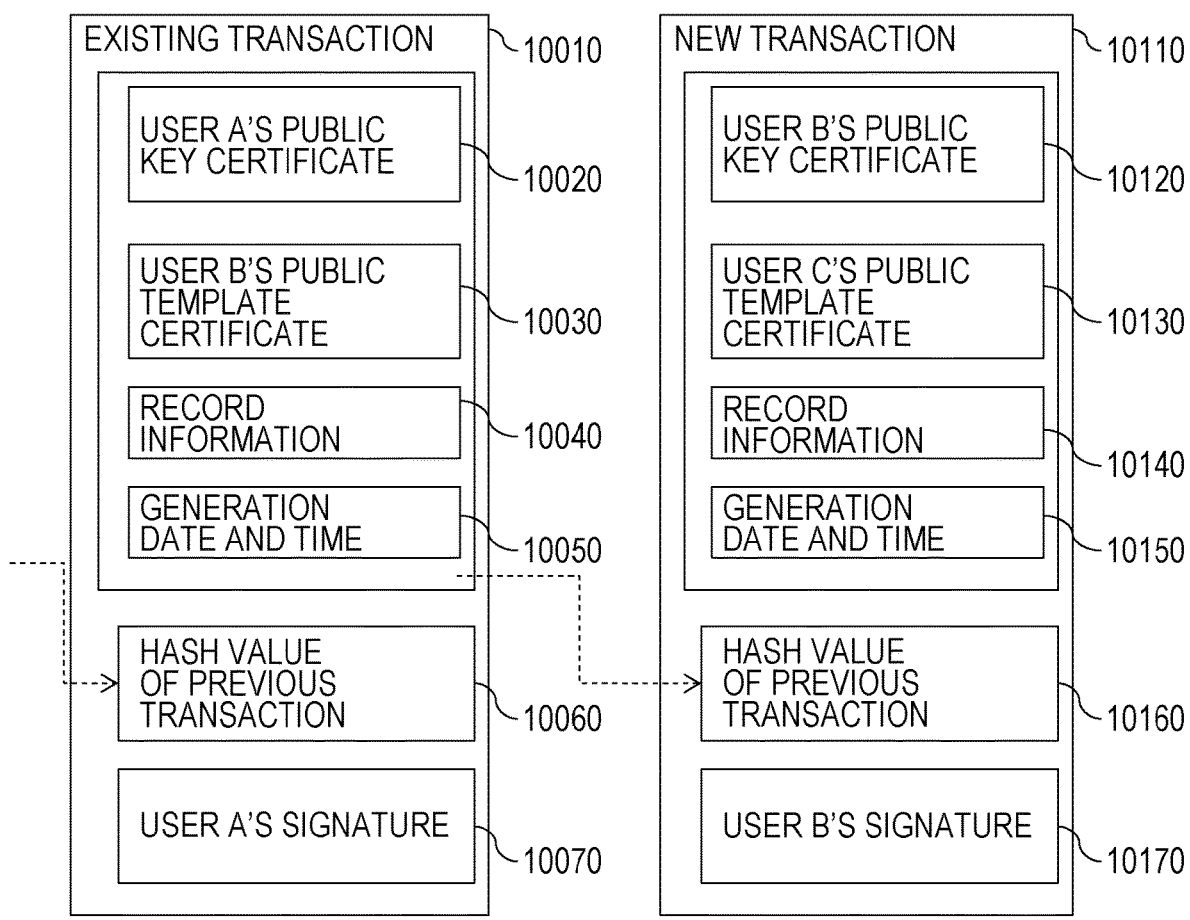
FIG. 10 is a diagram illustrating the first embodiment of the present invention and illustrating a data structure of a blockchain utilizing a biometric signature.

FIG. 10 is a diagram illustrating a data structure of the blockchain targeted by the first embodiment. FIG. 10 includes an existing transaction 10010 and a new transaction 10110.

The existing transaction 10010 corresponds to the transaction received in step S4010, and the new transaction 10110 corresponds to the transaction generated in step S5050. Each piece of data will be described below with reference to the drawing.

The existing transaction 10010 is a transaction in which transaction information from the user A to the user B is recorded and includes a user A's public key certificate 10020 (transaction source), a user B's public template certificate 10030 (transaction destination), a record information 10040, a generation date and time 10050, a hash value 10060, and a user A's signature 10070. For example, in the case of a virtual currency based on the blockchain, the user A corresponds to a remittance source and the user B corresponds to a remittance destination.

The user A's public key certificate 10020 is the public key certificate generated in step S3040 or step S8060. Note that the public key certificate may be stored in the above 10020 as it is. Alternatively, the public key certificate may be converted in accordance with some rules into data to be included in the 10020, which may be restored when the public key certificate is used. Further alternatively, only the serial number of the public key certificate may be stored in 10020, and the public key certificate may be acquired by using the serial number when the public key certificate is used.

A user B's public template certificate 10030 is the public template certificate generated in step S2130. Note that the public template certificate may store converted data or a serial number like the user A's public key certificate 10020.

The contents of the record information 10040 is to be guaranteed by the blockchain system. For example in the case of a virtual currency, record information includes a remittance amount, and in the case of a smart contract, record information includes the contents of the contract and other information.

The generation date and time 10050 indicates the date and time when the existing transaction 10010 has been created.

The hash value 10060 is a hash value obtained by inputting the entire transaction prior to the existing transaction to the hash function.

The user A's signature 10070 is obtained by inputting the contents of the existing transaction (10020 to 10050) and the hash value 10060 to the hash function to calculate the total hash value and generating a signature for the total hash value with the user A's secret key.

The new transaction 10110 is a transaction generated subsequent to the existing transaction 10010 and represents a transaction from the user B to a user C.

A user B's public key certificate 10120, a user C's public template certificate 10130, record information 10140, a generation date and time 10150, a hash value 10160 of the previous transaction, and a user B's signature 10170 included in the new transaction 10110 are similar to the user A's public key certificate 10020, the user B's public template certificate 10030, the record information 10040, the generation date and time 10050, the hash value 10060, and the user A's signature 10070 in the existing transaction 10010, respectively.

The new transaction 10110 is generated in step S5050 and then verified in step S4220. When the new transaction is verified, first, the verification terminal 1100 verifies the validity of the user C's public template certificate 10130 using the public key of the certificate authority, then verifies the validity of the user B's public key certificate 10120 using the user B's public template certificate 10030, and then verifies the validity of the user B's signature 10170 using the user B's public key certificate 10120. When all of the verifications are successful, the verification terminal 1100 approves the transaction.

In a known blockchain system, a public key of user B is stored in an existing transaction, and a signature of user B is stored in a new transaction, which are then verified. Therefore, in the case where the user B loses the user's secret key after the existing transaction has been generated, a signature cannot be attached to the new transaction, and thus transactions cannot be generated continuously.

In the first embodiment, the user B's public template certificate 10030 is stored in the existing transaction 10010, and the user B's public key certificate 10120 and the user B's signature 10170 are stored in the new transaction 10110, which are then verified. The verification of the validity of a transaction in the first embodiment includes two stages such as a public template certificate and a public key certificate, and a public key certificate and a signature.

By adopting such a two-stage verification procedure, even when the user B loses the secret key, the public key certificate can be reissued by using biometric information of the user B as a key. Since the biometric information is a characteristic inside the body of the user B, it is unlikely that the biometric information is lost or leaked like an ordinary secret key.

This enables reduction of the risk that the user B cannot generate a new transaction due to the loss or leakage of the secret key. In addition, since maintaining only the secret key is enough at a normal time for generation of a transaction like in a known blockchain system, using biometric information does not deteriorate the convenience of the user B like in the conventional example.

Figure 11:
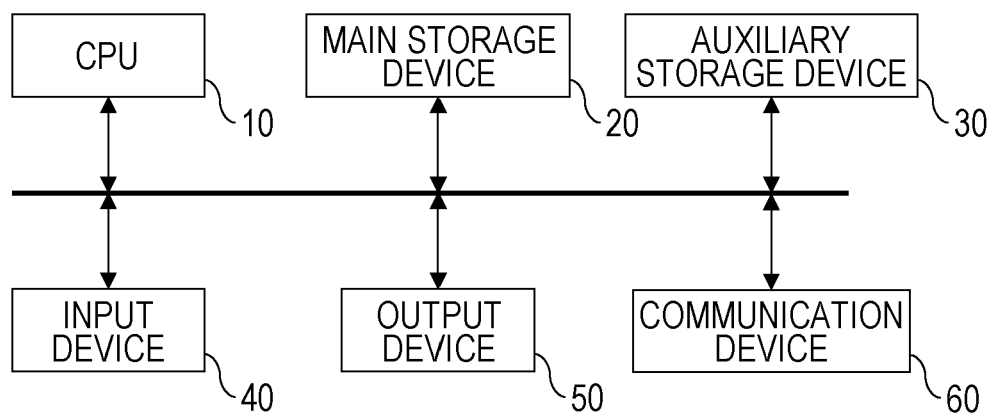
FIG. 11 is a block diagram illustrating the first embodiment of the present invention and illustrating a hardware configuration of a signature terminal, a verification terminal, and a public template repository.

FIG. 11 is a block diagram illustrating a hardware configuration of the signature terminal 1000, the public template repository 1200, and the verification terminal 1100 in the blockchain system.

In this figure, reference numeral 10 denotes a central processing unit (CPU), 20 denotes a main storage device, 30 denotes an auxiliary storage device, 40 denotes an input device, 50 denotes an output device, and 60 denotes a communication device.

The CPU 10 executes programs that correspond to the public template generating unit 1030, the key pair generating unit 1040, the public key certificate generating unit 1050, the hash value generating unit 1061, the signature generating unit 1070, the new transaction generating unit 1071, the public key revocation application form generating unit 1080, the public key certificate verifying unit 1120, the signature verifying unit 1140, the public template certificate generating unit 1220, the public key revocation application form verifying unit 1230, and the certificate revocation list generating unit 1240.

The main storage device 20 is a device corresponding to a memory of a computer and stores programs that corresponds to the public template generating unit 1030, the key pair generating unit 1040, the public key certificate generating unit 1050, the hash value generating unit 1061, the signature generating unit 1070, the new transaction generating unit 1071, the public key revocation application form generating unit 1080, the public key certificate verifying unit 1120, the signature verifying unit 1140, the public template certificate generating unit 1220, the public key revocation application form verifying unit 1230, and the certificate revocation list generating unit 1240. Execution of these programs by the CPU 10 results in implementation of each processing.

The auxiliary storage device 30 is a storage device typified by a hard disk drive (HDD) and a solid state drive (SSD) and corresponds to the key storing unit 1091, the public template certificate storing unit 1092, the public template certificate storing unit 1290, and the certificate revocation list storing unit 1291. Data stored in each of the units is accumulated as data on the auxiliary storage device 11030.

The input device 40 includes a sensor, a mouse, and keyboard, and the like. The output device 50 includes a display or other devices for outputting information on the main storage device 11020. The communication device 60 is used when the signature terminal 1000, the public template repository 1200, and the verification terminal 1100 communicate with the network 100.

The CPU 10 operates as a functional unit that provides a predetermined function by processing in accordance with a program of each of the functional units. For example, the CPU 10 functions as the public template generating unit 1030 by processing in accordance with a public template generating program. The above similarly applies to other programs as well. Furthermore, the CPU 10 also operates as a functional unit that provides each function of a plurality of pieces of processing executed by each program. A computer or a computer system is a device or a system that includes these functional units.

The programs and information such as tables for implementing each function can be stored in a storage device such as a nonvolatile semiconductor memory, a hard disk drive, an SSD (Solid State Drive) or the like comprising the auxiliary storage device 30, or a storage device such as an IC card, an SD card, a DVD can be stored in a computer-readable non-transitory data storage medium.

As described above, according to the first embodiment, a public template certificate is generated from biometric information of a user, a pair of a secret key and a public key is generated, a public key certificate is generated by attaching a biometric signature to the public key by using the biometric information of the user as a key, attaching a signature to a message by using the secret key when the user generates the signature, when the signature is verified, the validity of the public key certificate is verified with a public template certificate and the validity of the user's signature is further verified by the public key certificate, and when the keys are updated, a pair of a secret key and a public key is generated again and a signature is attached to the public key using the biometric information as a key, which enables reissuance of a public key certificate.

In addition, a transaction includes the public key certificate of the transaction source and the public template certificate of the transaction destination, and when the signature is verified, the validity of the public key certificate 10120 of the new (second) transaction 10110 is verified using the public template certificate 10030 of the existing (first) transaction 10010, and then the validity of the user's signature 10170 included in the new transaction 10110 is verified using the public key certificate 10120 included in the new transaction 10110, which allows the blockchain system to be configured.

Furthermore, the public template certificate can be attached with a signature with a secret key of a certificate authority, and when the signature is verified, the validity can be verified with a public key of the certificate authority that corresponds to the secret key of the certificate authority.

Second Embodiment

In a second embodiment, in the case where a user of a blockchain system has lost or leaked the use's secret key, a system that enables continuous use of the blockchain system is configured without the public template repository 1200 by causing a signature terminal 1000 to revoke the secret key to reissue a new secret key.

In the first embodiment, the public template repository 1200 is provided as a reliable third party organization, and a public template certificate and a certificate revocation list are issued via the public template repository 1200.

In such a blockchain system, the public template repository 1200 functioning as a certificate authority allows a highly reliable public template certificate and a certificate revocation lists to be issued. However, in a blockchain system, it is also desired to implement transaction management at a low cost without providing a reliable third party organization, and in the case where a certificate authority that requires a certain level of cost for operation is provided, the operation cost of the blockchain system rises.

Therefore, in the second embodiment, when the secret key is lost or leaked, without using the public template repository 1200 the secret key is revoked to reissue a new secret key like in the first embodiment, thereby allowing transactions to be generated continuously. In the second embodiment, the processing of FIGS. 2, 6, and 7 of the first embodiment and the data of FIGS. 9A to 9O are modified, the public template repository 1200 of FIG. 1 and the certificate revocation list of FIG. 9D are deleted. The rest of the configuration is similar to that of the first embodiment. Hereinafter, a difference from the first embodiment will be described.

Figure 12:
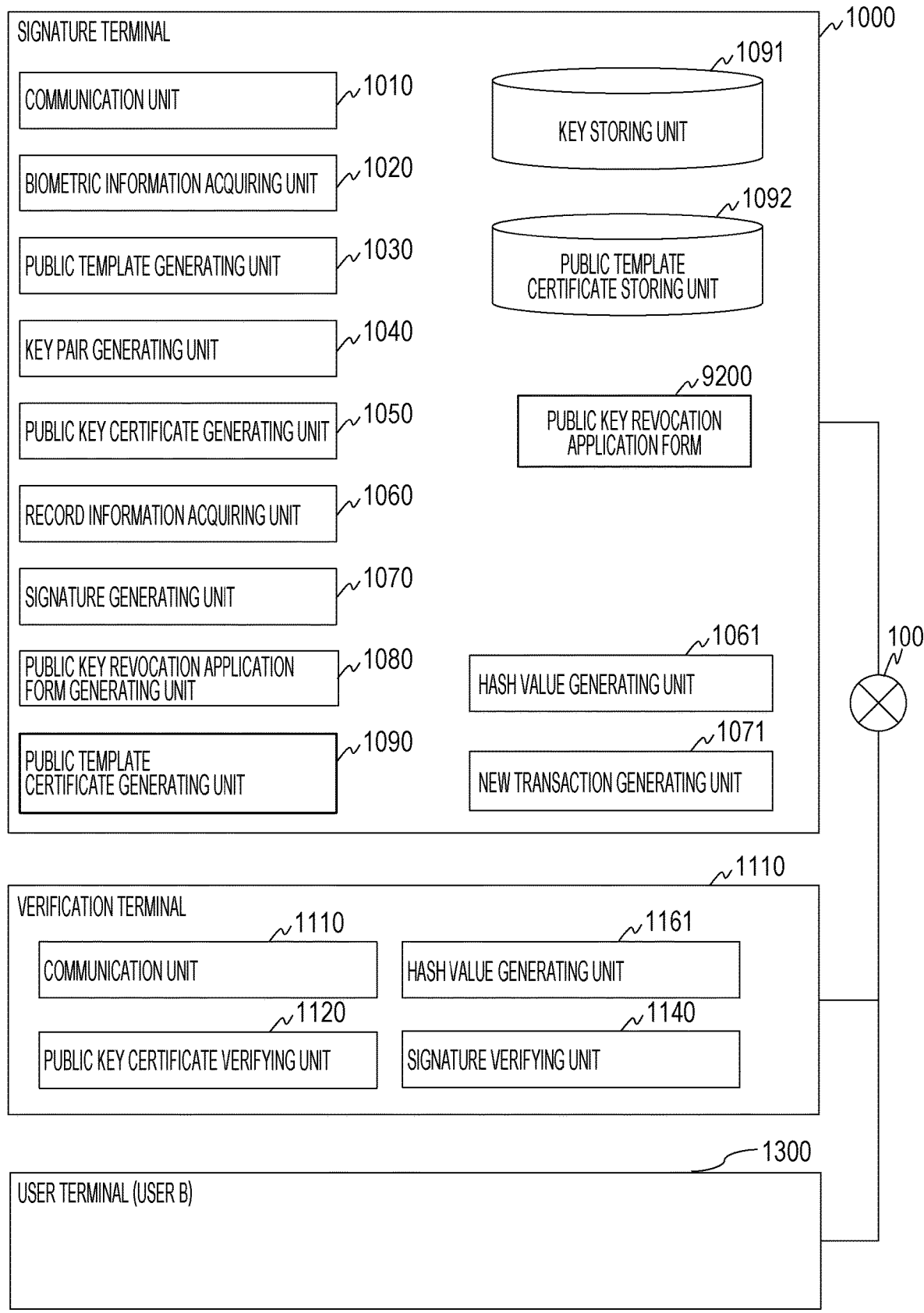
FIG. 12 is a block diagram illustrating a second embodiment of the present invention and illustrating an exemplary blockchain system.

FIG. 12 is a block diagram illustrating an exemplary blockchain system according to the second embodiment. In the blockchain system of FIG. 12, points different from the first embodiment are that the public template certificate generating unit operating in the public template repository 1200 of the first embodiment is operated in a signature terminal 1000 and that a public key revocation application form 9200 is held in the signature terminal 1000.

Figure 13:
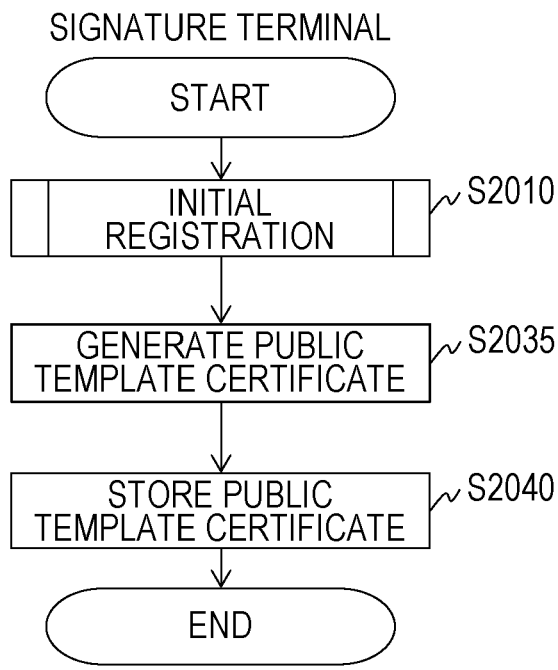
FIG. 13 is a flowchart illustrating the second embodiment of the present invention and illustrating a processing procedure of issuing a public template certificate.

FIG. 13 is a flowchart illustrating exemplary processing of initial registration of a public template certificate according to the second embodiment. In the second embodiment, the processing by the public template repository 1200 is deleted from the processing of FIG. 2 of the first embodiment, and the signature terminal 1000 executes the processing of generating a public template certificate.

In step S2010, the signature terminal 1000 performs initial registration like in the first embodiment. Next, a public template certificate generating unit 1090 generates a public template certificate in step S2035. In this processing, the public template certificate generating unit 1090 attaches a signature to a public template to generate a public template certificate. Then in step S2040, the public template certificate generating unit 1090 registers the public template certificate in a public template certificate storing unit 1092.

Figure 15:
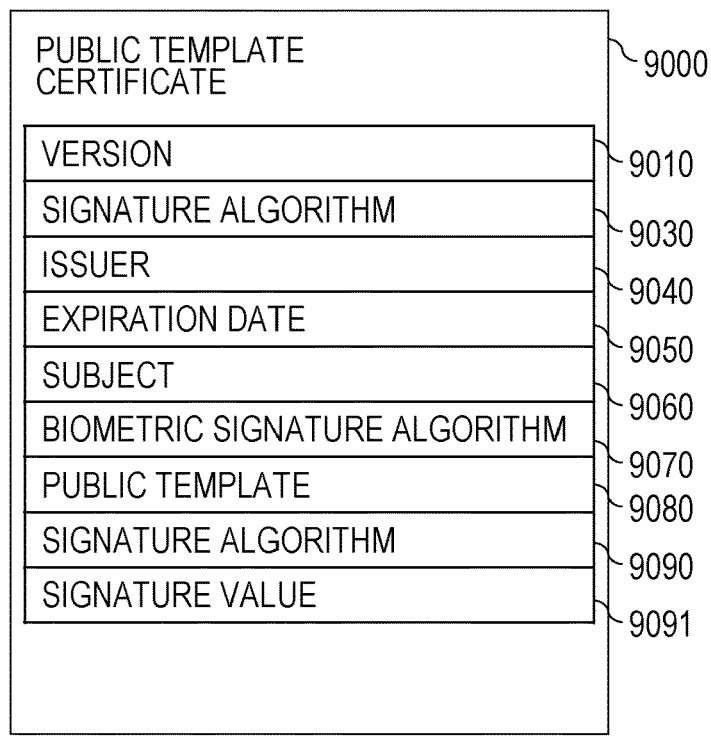
FIG. 15 is a diagram illustrating the second embodiment of the present invention and illustrating a data structure of a public template certificate.

FIG. 15 is a diagram illustrating an example of a public template certificate 9000 of the second embodiment. The public template certificate 9000 of the second embodiment is obtained by deleting the public template serial number 9020 of FIG. 9A of the first embodiment.

An issuer 9040, as the subject issuing the public template certificate place of the certificate authority of the first embodiment, stores an identifier of the signature terminal 1000. In addition, a signature value 9091 of the public template certificate is replaced with the signature of the certificate authority and is a biometric signature using biometric information (public template) of the user as a key. In this manner, attaching the user's own biometric signature to the public template certificate enables detection of tampering by a third party.

In the transaction verification (S4220) illustrated in FIG. 6 of the first embodiment, in the public template certificate verification S6010, the signature value 9091 is verified using the public key of the certificate authority. In the second embodiment, the validity of the signature value 9091 is verified using a public template 9080. This enables verification of whether the public template certificate has not been tampered. Processing after S6020 in the second embodiment is similar to that of the first embodiment.

Figure 14:
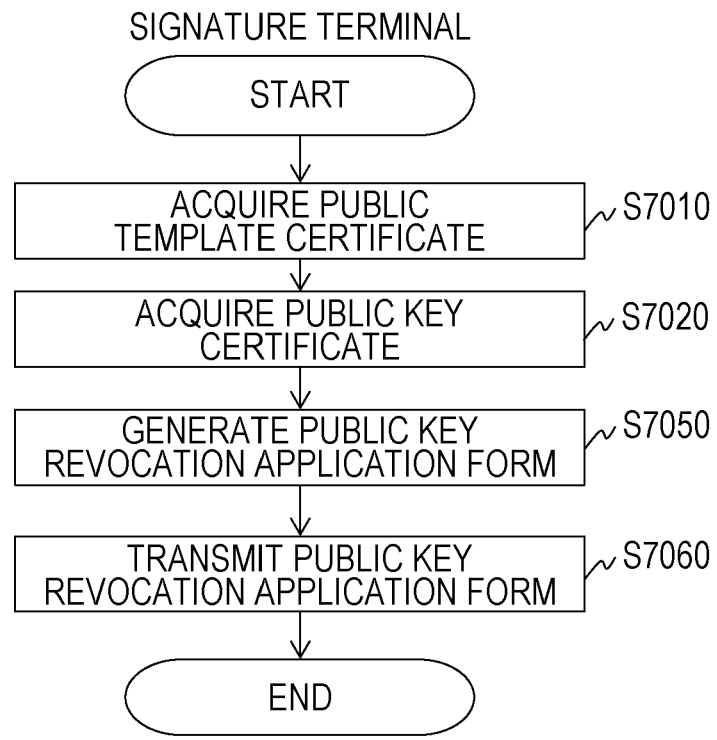
FIG. 14 is a flowchart illustrating the second embodiment of the present invention and illustrating a processing procedure of public key revocation.

FIG. 14 is a flowchart illustrating exemplary processing of revoking the public key certificate of the second embodiment. In FIG. 7 of the first embodiment, verification of the validity of the public key revocation application form is performed in the public template repository 1200 (S7120), and the certificate revocation list is issued when the verification is successful (S7140).

In the second embodiment, since the public template repository 1200 is deleted, the signature terminal 1000 generates a public key revocation application form in step S7050. The verification terminal 1100 stores the generated public key revocation application form and utilizes it when a transaction is verified.

Figure 16:
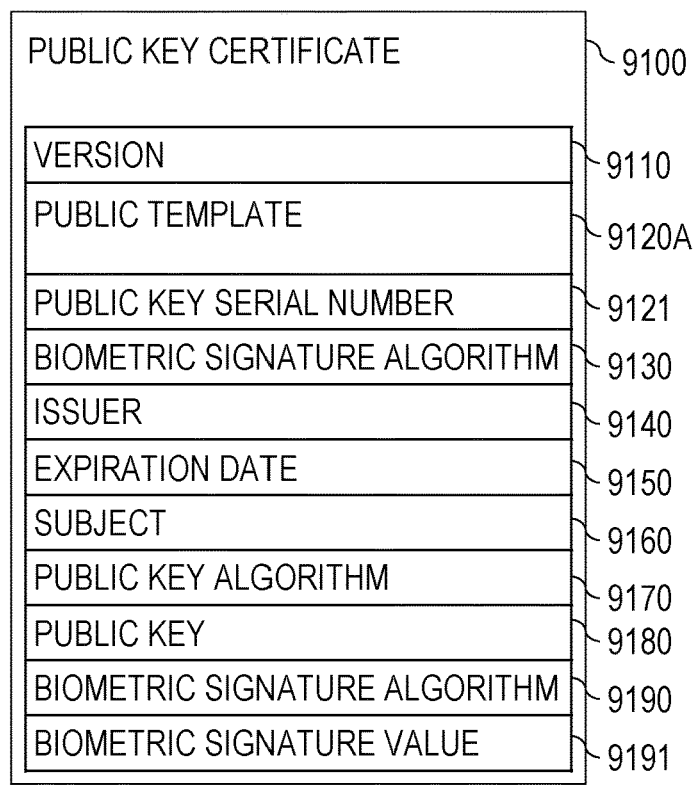
FIG. 16 is a diagram illustrating the second embodiment of the present invention and illustrating a data structure of a public key certificate.

FIG. 16 is a diagram illustrating a public key certificate 9100 of the second embodiment.

In the second embodiment, the public template serial number 9120 of the public key certificate 9100 illustrated in FIG. 9B of the first embodiment is not included in the public template certificate, but instead the public template 9080 itself or a hash value of the public template is stored in the public template 9120A. The rest of the configuration is similar to that of the first embodiment.

Figure 17:
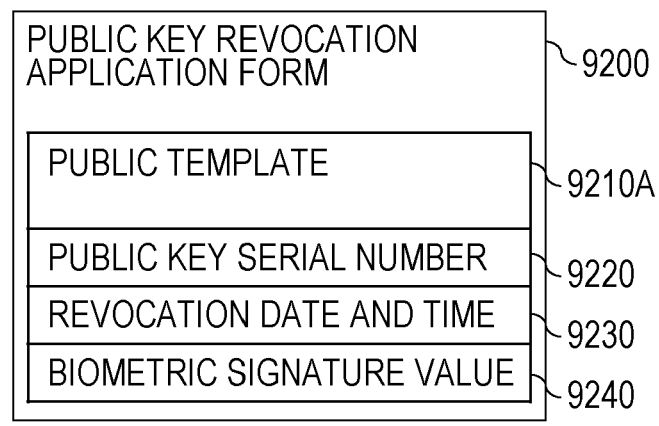
FIG. 17 is a diagram illustrating the second embodiment of the present invention and illustrating a data structure of a public key revocation application form.

FIG. 17 is a diagram illustrating a public key revocation application form 9200 of the second embodiment.

In the second embodiment, the public template serial number 9210 of the public key revocation application form 9200 illustrated in FIG. 9C of the first embodiment is not included in the public revocation application form, but instead the public template 9080 itself or the hash value of the public template is stored in the public template 9210A. The rest of the configuration is similar to that of the first embodiment.

Furthermore, in the second embodiment, the certificate revocation list 9300 illustrated in FIG. 9D of the first embodiment is not issued.

By modifying the processing procedure as described above, in the second embodiment, a blockchain system that can be used continuously even when the secret key is lost or leaked can be implemented without using the public template repository 1200.

According to the second embodiment, by verifying the validity of the biometric signature included in the public template certificate by using the public template, even in a blockchain system in which no certificate authority is used, the validity of each certificate can be verified by user's biometric information, which can reduce the cost required for the certificate authority.

Third Embodiment

Figure 18:
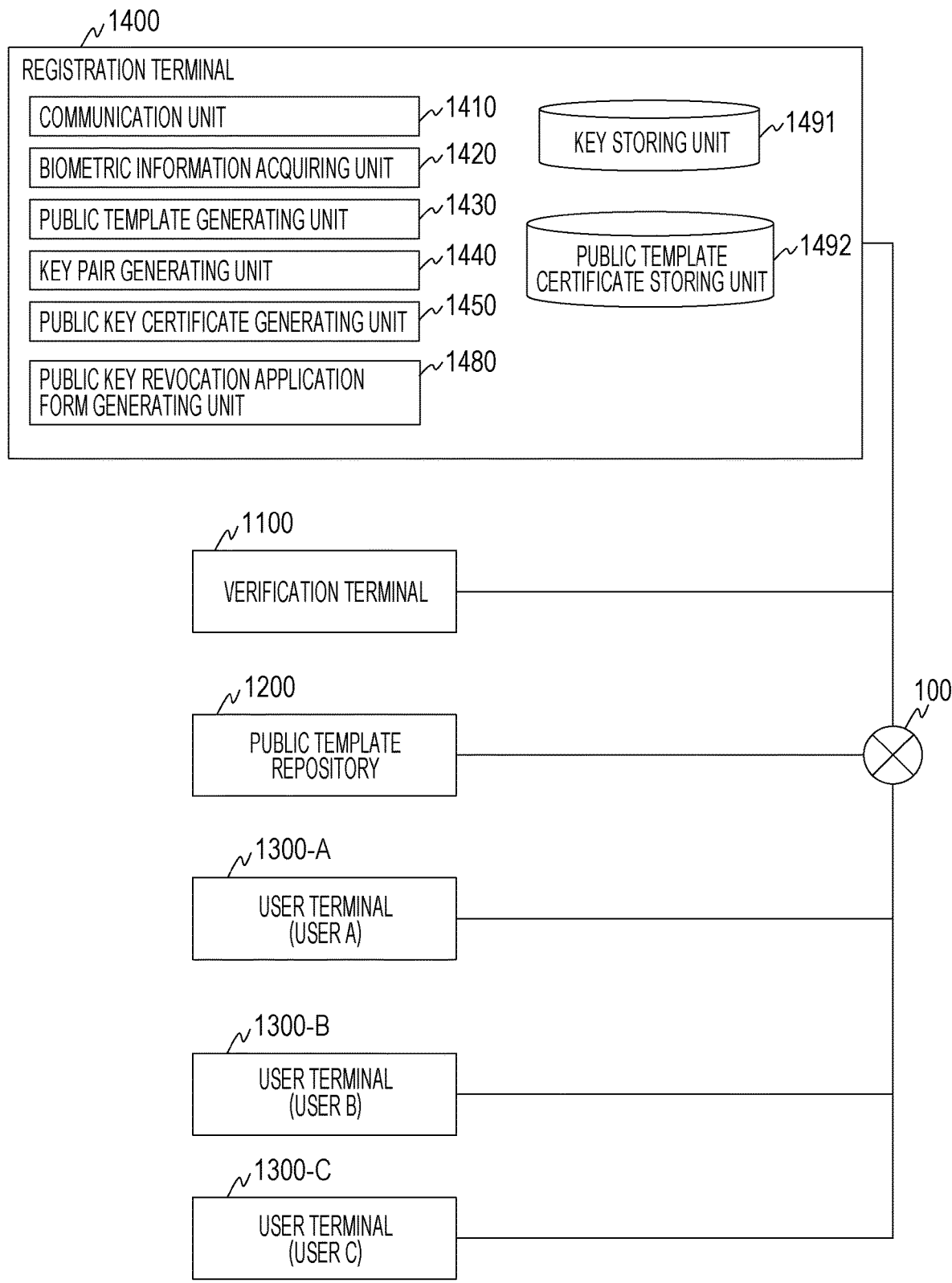
FIG. 18 is a block diagram illustrating a third embodiment of the present invention and illustrating an exemplary blockchain system.

A third embodiment illustrates a blockchain system obtained by adding, to the blockchain system of the first embodiment, a registration terminal for acquiring biometric information and generating a key pair and a public template. FIG. 18 is a block diagram illustrating a blockchain system according to the third embodiment.

In the blockchain system, a registration terminal 1400 for registering keys and public template certificates of users A to C, a verification terminal 1100 for verifying the validity of a transaction, a public template repository 1200 for generating a public template certificate, and user terminals 1300-A to 1300-C each for generating a transaction are connected via a network 100.

The verification terminal 1100 and the public template repository 1200 are similar to those of the first embodiment. The user terminals 1300-A to 1300-C are similar to the signature terminal 1000 of the first embodiment, and the user terminals are collectively denoted by the reference numeral 1300.

The registration terminal 1400 is obtained by omitting the functional units for generating a transaction from the signature terminal 1000 of the first embodiment, and the record information acquiring unit 1060, the signature generating unit 1070, the hash value generating unit 1061, and the new transaction generating unit 1071 illustrated in FIG. 1 are omitted. The rest of the configuration is similar to that of the first embodiment.

In the blockchain system of the third embodiment, the users A to C of the blockchain system first acquire biometric information from the registration terminal 1400 and register a public template certificate and keys. Next, keys and certificates are transmitted from the registration terminal 1400 to each of the user terminals 1300-A to 1300-C used by the users A to C, respectively, and stored therein. Thereafter, each of the users transmits or receives a public key, etc. and then transmits a transaction. Note that transmission of a key pair and certificates may be performed offline. Alternatively, like in the first embodiment, public key certificates may be generated in the user terminals 1300.

Figure 19:
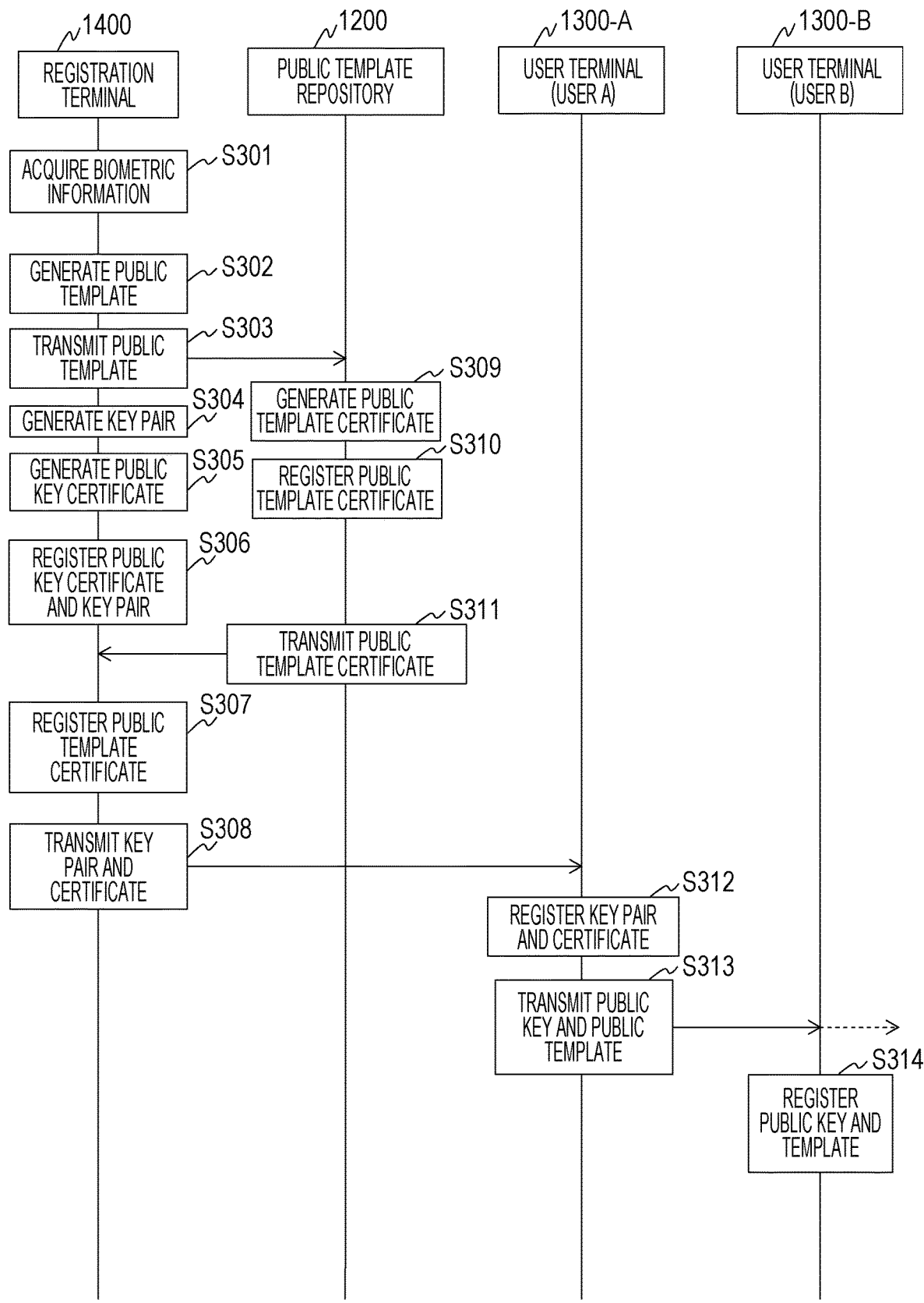
FIG. 19 is a sequence diagram illustrating the third embodiment of the present invention and illustrating an example of registration processing performed in the blockchain system.

FIG. 19 is a sequence diagram illustrating an example of registration processing performed in the blockchain system.

This processing is a registration processing that a user using the blockchain system initially performs like in FIGS. 2 and 3 of the first embodiment. Hereinafter, exemplary registration processing of the user A will be described.

First, in the registration terminal 1400, a biometric information acquiring unit 1420 acquires biometric information of the user A (S301).

A public template generating unit 1430 generates a public template by applying unidirectional conversion to the biometric information acquired in step S301 (S302). The public template generating unit 1430 transmits the generated public template to the public template repository 1200 (S303).

A key pair generating unit 1440 of the registration terminal 1400 generates a key pair of a secret key and a public key (S304).

A public key certificate generating unit 1050 of the registration terminal 1400 generates a public key certificate by attaching, to the generated public key, a biometric signature using the biometric information acquired in step S301 as a key (S305).

The registration terminal 1400 stores the secret key, the public key, and the public key certificate in a key storing unit 1491 (S306).

Next, in the public template repository 1200, a public template certificate generating unit 1220 attaches a signature to the received public template to generate a public template certificate (S309). In the third embodiment, signature is added using the secret key of the certificate authority like in the first embodiment.

The public template repository 1200 registers the generated public template certificate in a public template certificate storing unit 1290 (S310) and further transmits the public template certificate to the registration terminal 1400 (S311). When receiving the public template certificate, the registration terminal 1400 registers the public template certificate in the public template certificate storing unit 1492 (S307).

Next, the registration terminal 1400 transmits the key pair, the public key certificate, and the public template certificate to the user terminal 1300-A that the user A is using (S308). The user terminal 1300-A registers the received key pair and the public key certificate in a key storing unit 1491 and registers the public template certificate in a public template certificate storing unit 1492 (S312).

Next, the user terminal 1300-A transmits the public key and the public template to the user terminal 1300-B or other terminals to which the transaction is to be transmitted (S313). The user terminal 1300-A registers the received public key and the public template in a storing unit (S314).

In this manner, the key pair and the public key certificate are generated, the registration processing is completed, and preparation for transmitting and receiving the transaction is completed.

Figure 20:
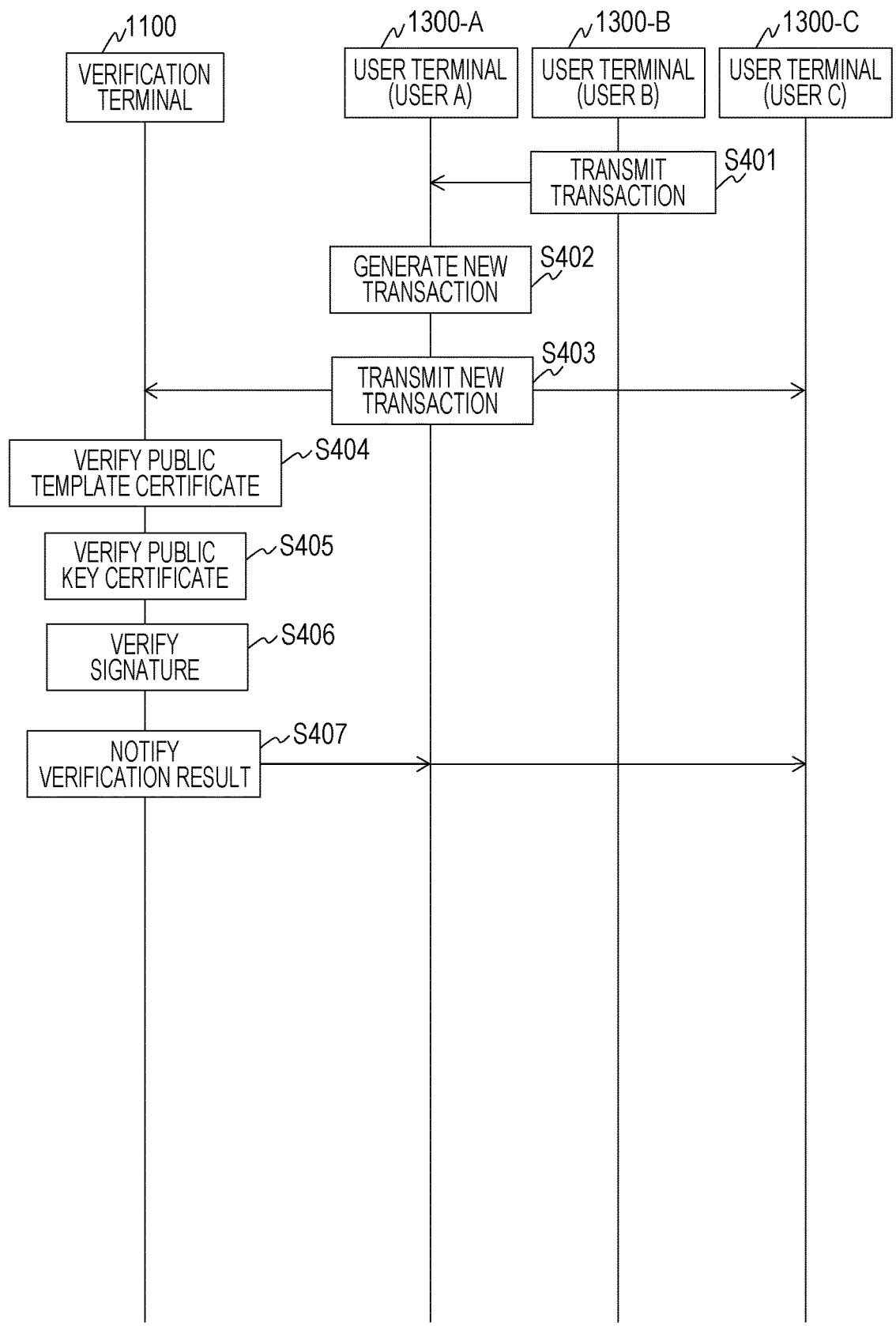
FIG. 20 is a sequence diagram illustrating the third embodiment of the present invention and illustrating an example of transaction verification processing performed in the blockchain system.

FIG. 20 is a sequence diagram illustrating an example of transaction verification processing performed in the blockchain system. This processing is similar to that of FIGS. 4 to 6 of the first embodiment. In FIG. 20, an example in which the user A receives an existing transaction transmitted by the user B and the user A generates a new transaction and transmits the new transaction to the user C will be illustrated.

First, the user terminal 1300-B transmits the existing transaction, and the user terminal 1300-A receives the existing transaction (S401). Note that transmission of transactions is broadcast within the blockchain system, and P2P networks are used for transmission of public keys or public templates.

The user terminal 1300-A generates a new transaction by adding the signature of the user A to the existing transaction (S402) and broadcasts the new transaction destined to the user terminal 1300-C (S403). The verification terminal 1100 receives the broadcast new transaction and starts verification.

The verification terminal 1100 verifies the validity of the public template certificate included in the new transaction (S404). The public template certificate is attached with a signature value generated with the secret key of the certificate authority, and the verification terminal 1100 verifies the validity of the signature value using the public key of the certificate authority. As a result, the verification terminal 1100 can verify whether the public template certificate has been certainly issued by the certificate authority.

Next, the verification terminal 1100 verifies the validity of the public key certificate included in the new transaction by using the public template certificate included in the existing transaction (S405). The public key certificate is attached with a biometric signature using biometric information as a key. The validity whether this biometric signature has been attached by the identical person is verified using the public template certificate.

This allows the verification terminal 1100 to verify that the user who has generated the public template certificate included in the existing transaction is identical to the user who has generated the public key certificate included in the new transaction. Furthermore, in step S405, it is verified that the public key certificate is not included in a certificate revocation list 9300.

Next, the verification terminal 1100 verifies the validity of the signature (S406). This processing is similar to the steps S6050 to 6070 of FIG. 6 illustrated in the first embodiment, and the verification terminal 1100 generates a hash value to verify the validity of the signature by using the generated hash value and the public key certificate.

The verification terminal 1100 notifies the user terminals 1300-A and 1300-C of the verification results of the public template certificate, the public key certificate, and the signature.

As described above, the verification terminal 1100 can verify the contents of the transactions.

Figure 21:
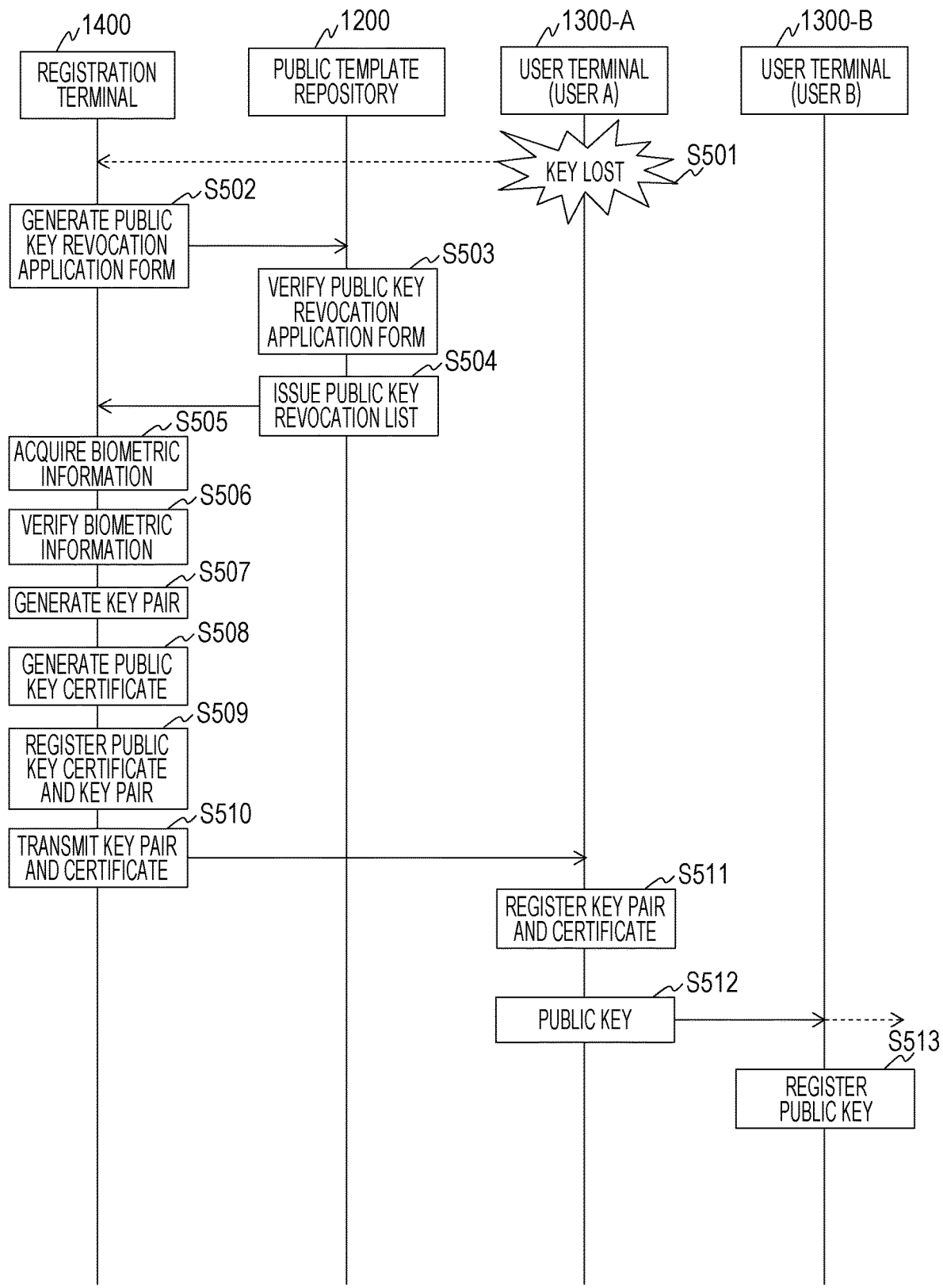
FIG. 21 is a sequence diagram illustrating the third embodiment of the present invention and illustrating an example of key reissuance processing performed in the blockchain system.

FIG. 21 is a sequence diagram illustrating an example of key reissuance processing performed in the blockchain system. This processing is similar to that FIGS. 7 and 8 of the first embodiment, and FIG. 21 illustrates an example in which the user A loses a secret key.

The user A of the user terminal 1300-A has lost the secret key (S501), and thus the registration terminal 1400 starts key reissuance processing. The registration terminal 1400 acquires the public key certificate and the public template certificate of the user A from the key storing unit 1491 and the public template certificate storing unit 1492 to generate a public key revocation application form (S502) and transmits the public key revocation application form to the public template repository 1200 (S503).

The public template repository 1200 verifies the validity of the public key revocation application form (S503). In this verification, the public template repository 1200 verifies that the signature value assigned to the public key revocation application form is genuine by using the public template certificate. If the verification is successful, the public template repository 1200 issues a public key revocation list (S504). The public template repository 1200 registers the public key revocation list in a certificate revocation list storing unit 1291 and transmits the public key revocation list to the registration terminal 1400.

After receiving the public key revocation list, the registration terminal 1400 acquires biometric information of the user A (S505). Using the biometric signature of the public template certificate, the registration terminal 1400 verifies whether the biometric information with which the public template certificate has been generated and the acquired biometric information have been acquired from the same person, and if from the same person, the verification is regarded as being successful.

If the verification is successful, the registration terminal 1400 generates a key pair like in the first embodiment (S507) and generates a public key certificate by attaching a signature to the public key (S508). The registration terminal 1400 registers the key pair and the public key certificate in the key storing unit 1491 (S509) and then transmits the key pair and the public key certificate to the user terminal 1300-A of the user A (S510).

The user terminal 1300-A deletes the old key pair and public key certificate and registers the received new key pair and the public key certificate in the key storing unit 1091 (S511). Next, the user terminal 1300-A transmits the public key to the user terminal 1300-B which a transaction is transmitted to or received from (S512).

The user terminal 1300-B deletes the old public key of the user A and registers the newly received public key in a key storing unit 1091 (S513).

As described above, in the third embodiment, a public key certificate can be reissued by attaching a signature to the public key using user's biometric information acquired using the registration terminal 1400 as a key. In the third embodiment, for example, the registration terminal 1400 may be installed in an organization that manages the blockchain system, thereby enabling acquisition of biometric information after the administrator or the like of the blockchain system confirms identity of the user. With this configuration, registration by impersonation can be suppressed.

Note that the registration terminal 1400 and the public template repository 1200 may be configured by a single computer. In this case, the registration units (the public key certificate generating unit 1450, the public template certificate generating unit 1220, and the public key revocation application form generating unit 1480) may be provided by a single computer. Alternatively, the registration terminal 1400, the public template repository 1200, and the verification terminal 1100 may be configured by a single computer. In this case, the registration units and the verifying units (public key certificate verifying unit 1120) can be provided by a single computer.

Fourth Embodiment

A fourth embodiment is obtained by modifying a part of the transaction of the blockchain system of the first or third embodiment, and the rest of the configuration is similar to that of the first or third embodiment.

Figure 22:
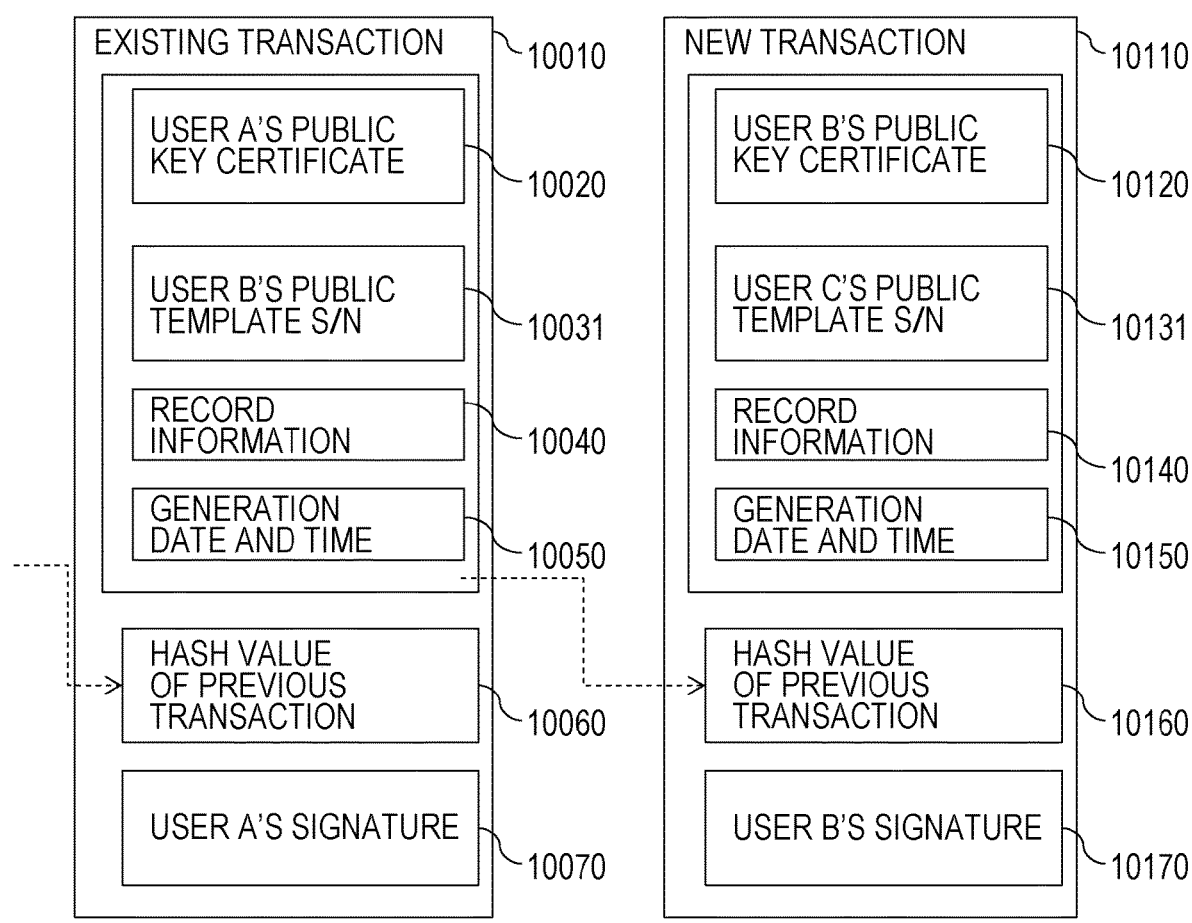
FIG. 22 is a diagram illustrating a fourth embodiment of the present invention and illustrating a data structure of a blockchain utilizing a biometric signature.

FIG. 22 is a block diagram illustrating an example of a data structure of a blockchain of the fourth embodiment. A modification in the fourth embodiment is that, out of the transaction illustrated in FIG. 10 of the first embodiment, public template serial numbers (S/N) 10031 and 10131 are used instead of the public template certificates 10030 and 10130.

The public template serial number 10031 (10131) may be attached as a value associated with a public template certificate when a public template repository 1200 generates the public template certificate. Alternatively, when a registration terminal 1400 generates a public template, the public template serial number 10031 may be attached as a value associated with the public template. The public template serial number 10031 (10131) may be any number as long as the number is a unique identifier in the blockchain system.

Note that the public template repository 1200 stores the public template certificate and the public template serial number in a public template certificate storing unit 1290 in association with each other.

To verify the validity of an existing transaction 10010 or a new transaction 10110, for example, it is only required that a verification terminal 1100 request the public template certificate corresponding to the public template serial number 10031 (10131) to the public template repository 1200.

As described above, the size of a transaction is suppressed by setting the public template serial number 10031 (10131) in the transaction as an identifier for identifying the user instead of the public template certificate. Then, when accepting the transaction, the verification terminal 1100 acquires the public template serial number 10031 and can cause the public template repository 1200 to retrieve and acquire.

SUMMARY

Note that the present invention is not limited to the embodiments described above but may include various variations. For example, the embodiments described above are described in detail in order to facilitate understanding of the present invention, and thus the present invention is not necessarily limited to include all of the configurations having been described. A part of a configuration of one of the embodiments may be replaced with a configuration of another embodiment. Moreover, a configuration of an embodiment may be added with a configuration of another embodiment. In addition, a part of a configuration of an embodiment may be subjected to addition of, deletion of, or replacement with another configuration solely or in combination thereof.

In addition, a part or all of the aforementioned respective configurations, functions, processing units, processing means, or the like may be implemented by hardware, for example by designing by an integrated circuit. Also, the aforementioned respective configurations, functions, or the like may be implemented by software with a processor interpreting and executing a program implementing each of the functions. Information such as a program, a table, or a file implementing the respective functions may be secured in a storage device such as a memory, a hard disc, or a solid state drive (SSD) or a storage medium such as an IC card, an SD card, or a DVD.

Note that only control lines or data lines that are considered necessary for the purpose of description are illustrated, and thus not all control lines or data lines in a product are necessarily illustrated. In fact, it can be assumed that substantially all the configurations are connected with each other.

The invention claimed is:

1. A signature verification system for verifying a signature by a computer comprising a processor and a memory, the signature verification system comprising:
   a biometric information acquiring unit for acquiring biometric information of a user;
   a public template certificate generating unit for generating a public template certificate by applying predetermined processing to the biometric information;
   a key pair generating unit for generating a pair of a secret key and a public key;

a public key certificate generating unit for generating a public key certificate by attaching a biometric signature to the public key using the biometric information as a key; and a verifying unit for accepting a transaction including the public template certificate, the public key certificate, and the signature, verifying validity of the public key certificate with the public template certificate, and verifying the signature with the public key certificate.

2. The signature verification system according to claim 1, wherein the transaction includes a public key certificate of a transaction source and a public template certificate of a transaction destination, and the verifying unit accepts a first transaction and a second transaction subsequent thereto, verifies a public key certificate of the second transaction by using a public template certificate of the first transaction, and verifies a signature included in the second transaction by using the public key certificate included in the second transaction.

3. The signature verification system according to claim 1, further comprising:

a public template certificate storing unit for storing the public template certificate in association with a first identifier, wherein the transaction stores the first identifier in place of the public template certificate, and the verifying unit acquires the first identifier of the transaction to acquire the public template certificate associated with the first identifier from the public template certificate storing unit.

4. The signature verification system according to claim 1, wherein the public template certificate of the transaction includes a signature value generated with a secret key of a certificate authority, and the verifying unit verifies the signature value of the public template certificate using a public key of the certificate authority.

5. The signature verification system according to claim 1, wherein the public template certificate of the transaction includes a signature value having biometric information as a key and a public template generated from the biometric information, and the verifying unit acquires the public template from the transaction and verifies the signature value of the public template certificate by using the public template.

6. The signature verification system according to claim 1, further comprising:

a public key revocation application form generating unit for issuing a public key revocation application form attached with a second identifier for identifying the public key certificate and a biometric signature using the biometric information as a key.

7. The signature verification system according to claim 6, wherein the public key certificate generating unit acquires a public template certificate associated with the issued public key revocation application form, acquires biometric information of a user who uses the public template certificate, and in a case where the biometric information used for generation of the public template certificate matches with the acquired biometric information, generates a new key pair and a new public key certificate.

8. The signature verification system according to claim 1, wherein the computer comprises: a registration terminal for generating a key pair and a public key certificate; a verification terminal for accepting and verifying a transaction; and a public template repository for generating a public template certificate, the registration terminal comprises the biometric information acquiring unit, the key pair generating unit, and the public key certificate generating unit, the verification terminal comprises the verifying unit, and the public template repository comprises the public template certificate generating unit.

9. A signature verification method for verifying a signature by a computer comprising a processor and a memory, the signature verification method comprising:

a first step of acquiring biometric information of a user by the computer;

a second step of generating a public template certificate by applying predetermined processing to the biometric information by the computer;

a third step of generating a pair of a secret key and a public key by the computer;

a fourth step of generating a public key certificate by attaching a biometric signature to the public key using the biometric information as a key by the computer;

a fifth step of accepting a transaction including the public template certificate, the public key certificate, and the signature by the computer; and a sixth step of verifying validity of the public key certificate with the public template certificate included in the transaction and verifying the signature with the public key certificate by the computer.

10. The signature verification method according to claim 9, wherein the transaction includes a public key certificate of a transaction source and a public template certificate of a transaction destination, and the fifth step includes accepting a first transaction and a second transaction subsequent thereto, and the sixth step includes verifying a public key certificate of the second transaction by using a public template certificate of the first transaction and verifying a signature included in the second transaction by using the public key certificate included in the second transaction.

11. The signature verification method according to claim 9, wherein the second step includes storing, in a public template certificate storing unit, the public template certificate in association with a first identifier, the transaction stores the first identifier in place of the public template certificate, and the sixth step includes acquiring the first identifier of the transaction to acquire the public template certificate associated with the first identifier from the public template certificate storing unit.

12. The signature verification method according to claim 9, wherein the public template certificate of the transaction includes a signature value generated with a secret key of a certificate authority, and the sixth step includes verifying the signature value of the public template certificate using a public key of the certificate authority.

13. The signature verification method according to claim 9, wherein the public template certificate of the transaction includes a signature value having biometric information as a key and a public template generated from the biometric information, and the sixth step includes acquiring the public template from the transaction and verifying the signature value of the public template certificate by using the public template.

14. The signature verification method according to claim 9, further comprising:
a seventh step of issuing, by the computer, a public key revocation application form attached with a second identifier for identifying the public key certificate and a biometric signature using the biometric information as a key.

15. A non-transitory computer-readable recording medium storing a program for controlling a computer having a processor and a memory, the program causing the computer to execute:
a first step of acquiring a message to be included in a transaction;
a second step of generating a hash value of information included in the transaction;
a third step of attaching a signature by using a secret key having been generated in advance for the hash value;
a fourth step of acquiring a public template certificate having been generated in advance by applying predetermined processing to biometric information;
a fifth step of acquiring a public key certificate obtained by attaching a biometric signature to a public key corresponding to the secret key by using the biometric information as a key; and
a sixth step of generating the transaction including the public template certificate, the public key certificate, the message, and the signature.

* * * * *